US009157927B2

(12) United States Patent
Kanemoto

(10) Patent No.: US 9,157,927 B2
(45) Date of Patent: *Oct. 13, 2015

(54) PHYSICAL QUANTITY SENSOR AND ELECTRONIC APPARATUS

(71) Applicant: Seiko Epson Corporation, Tokyo (JP)

(72) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,023

(22) Filed: Apr. 14, 2014

(65) Prior Publication Data

US 2014/0224017 A1     Aug. 14, 2014

Related U.S. Application Data

(63) Continuation of application No. 13/116,455, filed on May 26, 2011, now Pat. No. 8,736,254.

(30) Foreign Application Priority Data

May 28, 2010   (JP) ................................. 2010-122959

(51) Int. Cl.
*G01P 15/02*    (2013.01)
*G01P 15/08*    (2006.01)
*G01P 15/125*   (2006.01)
*G01P 15/18*    (2013.01)

(52) U.S. Cl.
CPC ............. *G01P 15/02* (2013.01); *G01P 15/0802* (2013.01); *G01P 15/125* (2013.01); *G01P 15/18* (2013.01)

(58) Field of Classification Search
USPC ....................................... 324/162; 73/514.32
See application file for complete search history.

(56) References Cited

U.S. PATENT DOCUMENTS

| 5,488,864 A | 2/1996 | Stephan |
| 5,905,203 A | 5/1999 | Flach et al. |
| 6,170,332 B1 * | 1/2001 | MacDonald et al. ...... 73/514.38 |

(Continued)

FOREIGN PATENT DOCUMENTS

| DE | 10 2008 042 357 A1 | 4/2010 |
| EP | 1640726 A1 | 3/2006 |

(Continued)

OTHER PUBLICATIONS

Extended European Search Report for Application No. 11 16 7631.8 mailed Nov. 25, 2011 (9 Pages).

*Primary Examiner* — Tung X Nguyen
*Assistant Examiner* — Alesa Allgood
(74) *Attorney, Agent, or Firm* — Harness, Dickey & Pierce, P.L.C.

(57) ABSTRACT

A physical quantity sensor includes a first rocking body and a second rocking body. Each of the rocking bodies is supported on a substrate by a first supporting portion and a second supporting portion. The first rocking body is partitioned into a first region and a second region by a first axis (supporting axis) when viewed in plane, and the second rocking body is partitioned into a third region and a fourth region by a second axis (supporting axis) when viewed in plane. The mass of the second region is larger than the mass of the first region, and the mass of the third region is larger than the mass of the fourth region. An arranged direction of the first region and the second region is the same as an arranged direction of the third region and the fourth region.

8 Claims, 17 Drawing Sheets

(56) References Cited

U.S. PATENT DOCUMENTS

| | | | |
|---|---|---|---|
| 6,928,872 B2* | 8/2005 | Durante et al. | 73/504.04 |
| 7,578,190 B2* | 8/2009 | Lin et al. | 73/514.29 |
| 8,736,254 B2* | 5/2014 | Kanemoto | 324/162 |
| 2007/0220973 A1 | 9/2007 | Acar | |
| 2008/0173959 A1 | 7/2008 | Merassi et al. | |
| 2009/0031809 A1* | 2/2009 | Lin et al. | 73/514.32 |
| 2009/0107238 A1 | 4/2009 | Guo | |
| 2010/0018635 A1* | 1/2010 | Kouma et al. | 156/155 |
| 2010/0024553 A1 | 2/2010 | Classen et al. | |
| 2010/0058864 A1* | 3/2010 | Hsu et al. | 73/514.32 |
| 2011/0291644 A1* | 12/2011 | Kanemoto | 324/162 |

FOREIGN PATENT DOCUMENTS

| | | | |
|---|---|---|---|
| EP | 1947053 A2 | | 7/2008 |
| EP | 2053412 A2 | | 4/2009 |
| JP | 09-189716 A | | 7/1997 |
| JP | 2008-292451 A | | 12/2008 |
| JP | 2009-109494 A | | 5/2009 |
| JP | 2010-029966 A * | 2/2010 | B81C 1/00 |
| JP | 2010-512527 A | | 4/2010 |

\* cited by examiner

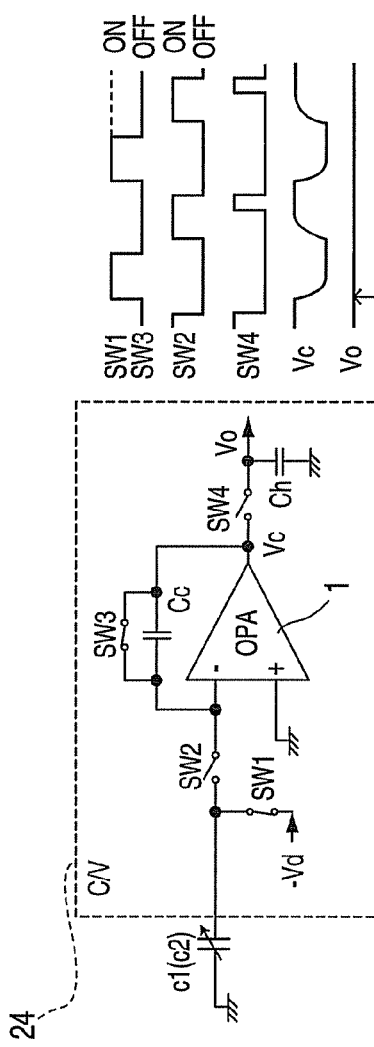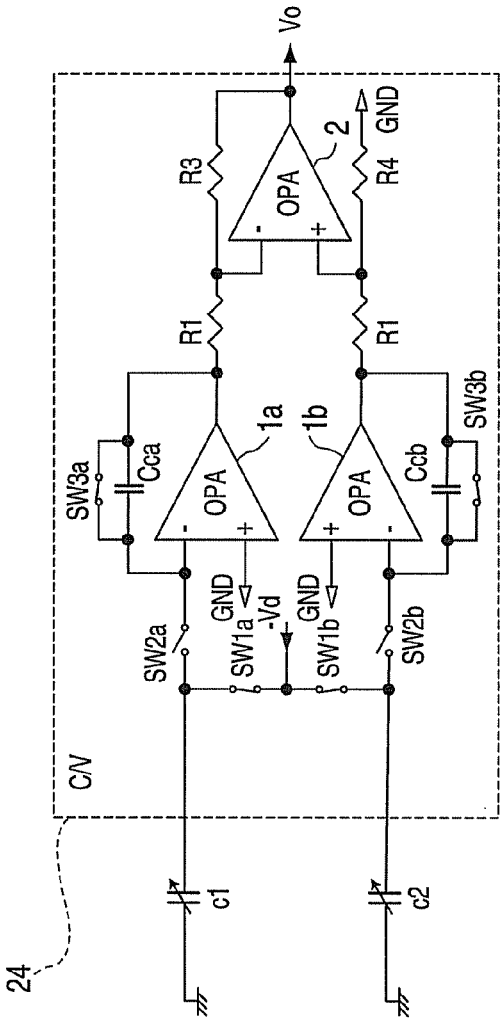
FIG. 5A
FIG. 5B
FIG. 5C

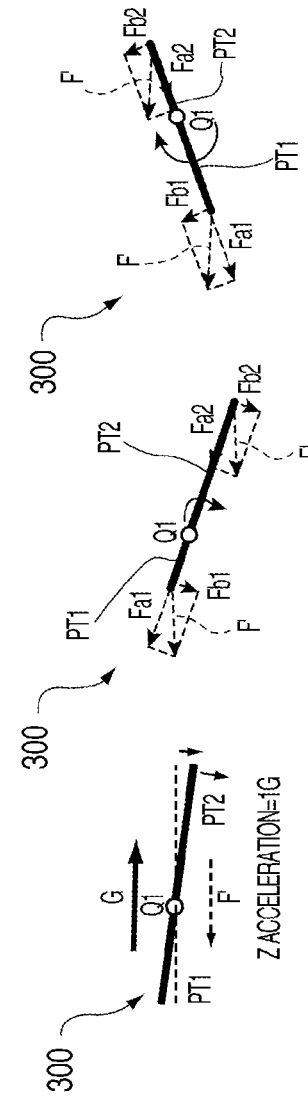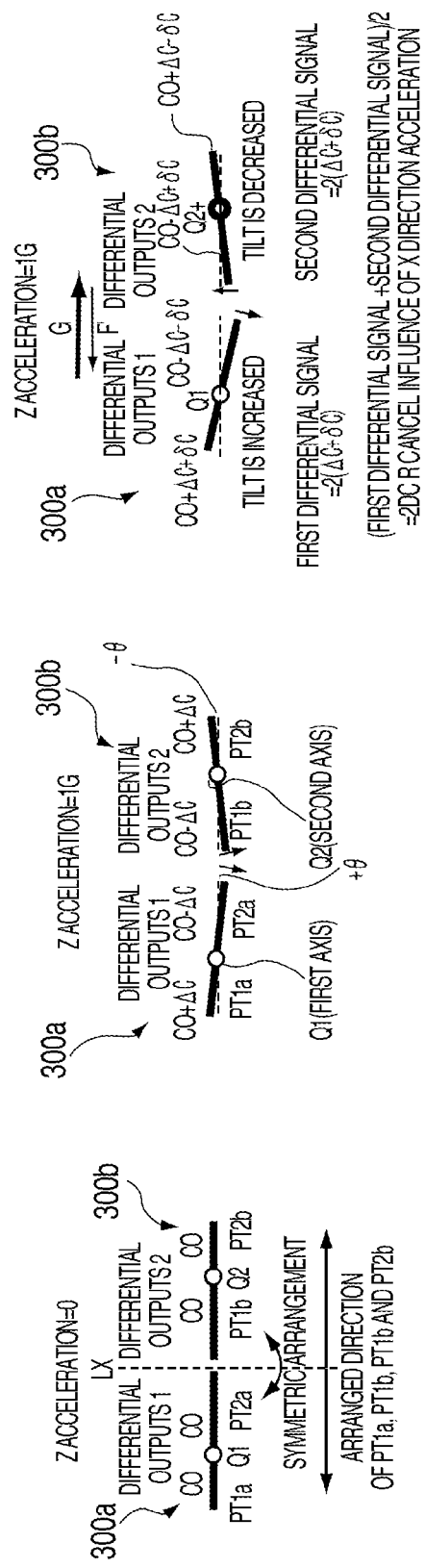

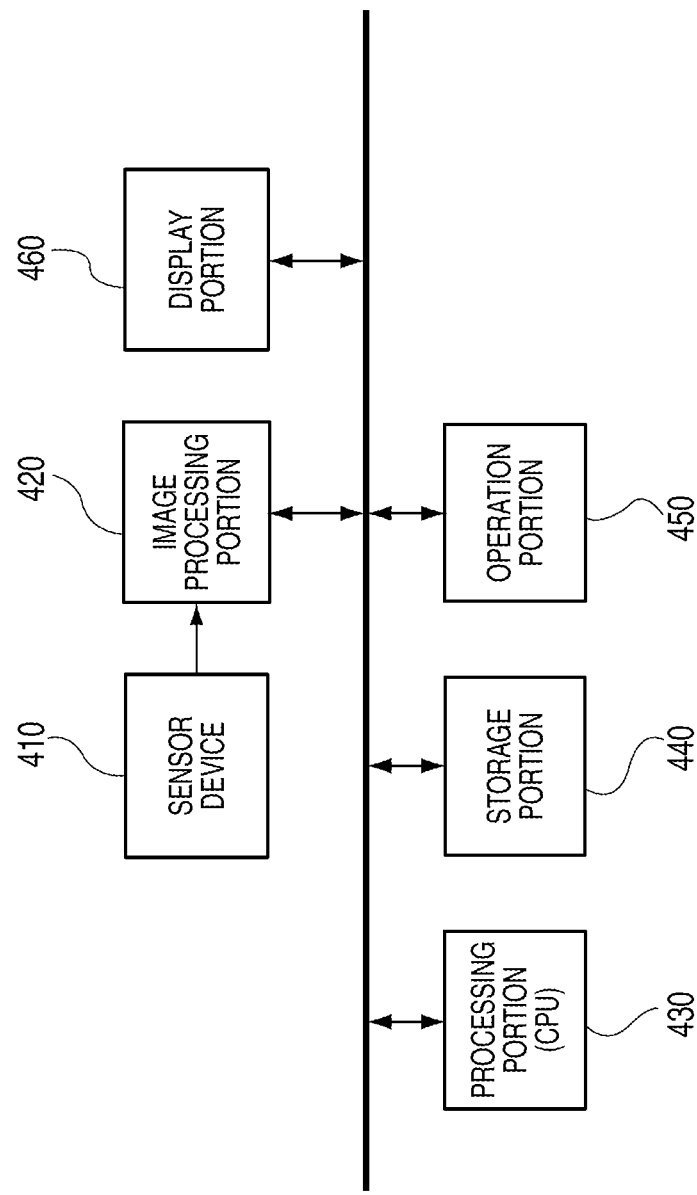

PHYSICAL QUANTITY SENSOR AND ELECTRONIC APPARATUS

CROSS-REFERENCE TO RELATED APPLICATIONS

This is a continuation patent application of U.S. patent application Ser. No. 13/116,455 filed May 26, 2011 which claims priority to Japanese Patent Application No. 2010-122959 filed May 28, 2010 all of which are incorporated by reference herein in their entireties.

BACKGROUND

1. Technical Field

The present invention relates to a physical quantity sensor such as, for example, an MEMS (Micro Electro Mechanical System) sensor, and an electronic apparatus.

2. Related Art

In recent years, a technique which implements a highly sensitive physical quantity sensor having a small size by using an MEMS (Micro Electro Mechanical System) technique has attracted attention.

For example, JP-A-2009-109494 discloses a pendulous capacitive accelerometer. The pendulous capacitive accelerometer disclosed in JP-A-2009-109494 includes a substrate, a sensing plate, a central anchor portion which supports the sensing plate on the substrate, an electrode provided on the sensing plate, and an electrode provided on the substrate. The sensing plate includes a solid proof mass (inertial mass) on the left side of the central anchor portion and a hollow proof mass. When a torque is applied to the respective proof masses due to the acceleration, then the sensing plate performs a seesaw operation about the central anchor portion (hinge axis). The capacitance value of a capacitor varies in response to the seesaw operation of the sensing plate, and a differential capacitive output signal is output from the pendulous capacitive accelerometer.

In addition, JP-A-9-189716 discloses an acceleration sensor in which a rocking body supported by rotational axis lines which are asymmetrically arranged is formed on a silicon substrate, the capacitance is differentially detected using the fact that the rocking body is tilted to one side when being applied with acceleration in the Z direction (seesaw rocking), and the acceleration in the Z direction is detected.

In the pendulous capacitive accelerometer disclosed in JP-A-2009-109494, forming a package for protecting the accelerometer is not taken into account.

In addition, in the acceleration sensor in JP-A-9-189716, even in a case where acceleration in the X direction or the Y direction other than the Z direction occurs, the rocking occurs in the rocking body, and thus acceleration in the Z direction seemingly varies. As such, having detection sensitivity for directions different from the detection direction reduces the detection accuracy of the physical quantity sensor, which becomes a problem.

SUMMARY

An advantage of some aspects of the invention is to improve an assembly property of a physical quantity sensor including, for example, a package. Another advantage of some aspects of the invention is to suppress decrease in detection sensitivity of the physical quantity sensor, for example, due to acceleration generated in directions other than a detection axis.

(1) One aspect of the invention is directed to a physical quantity sensor including a base, and a first rocking body and a second rocking body disposed over the base via a gap, wherein the first rocking body includes a first supporting portion, a second supporting portion, and a first movable electrode, is supported over the base by the first supporting portion and the second supporting portion which are disposed on a first axis, and is partitioned into a first region and a second region by the first axis when viewed in plan, where each of the first and second regions is provided with the first movable electrode, wherein the second rocking body includes a third supporting portion, a fourth supporting portion, and a second movable electrode, is supported over the base by the third supporting portion and the fourth supporting portion which are disposed on a second axis, and is partitioned into a third region and a fourth region by the second axis when viewed in plan, where each of the third and fourth regions is provided with the second movable electrode, wherein fixed electrodes facing the first movable electrode and the second movable electrode are formed on the base, wherein the mass of the second region is larger than the mass of the first region, and the mass of the third region is larger than the mass of the fourth region, and wherein a direction arranged from the first region to the second region of the first rocking body is equate to a direction arranged from the third region to the fourth region of the second rocking body.

(2) In another aspect of the physical quantity sensor of the invention, the first rocking body and the second rocking body may be tilted in opposite directions to each other in a state of being applied with gravity.

The aspect is related to a configuration for further improving the detection accuracy of the physical quantity sensor using a seesaw structure. For example, the rocking body is tilted due to unbalance between torques caused by unbalance between masses in a state of being applied with the gravitational acceleration (this is because gravitational acceleration cannot be detected in a state where the rocking body is maintained to be in a horizontal state despite the gravitational acceleration being applied). In this state, it is assumed that acceleration in a first direction which is the extension direction of the rocking body (an extension direction when the rocking body is in a horizontal state) acts on the rocking body. When the acceleration in the first direction acts on the tilted rocking body, the inertial force works on the rocking body in the direction opposite to the direction of the acceleration in the first direction (the magnitude of the inertial force is proportional to the acceleration in the first direction). Since the inertial force has a component of a force rotating the tilted rocking body (that is, a force vertically acting on the tilted rocking body), the tilt of the rocking body varies. In other words, although the acceleration in a third direction (gravity direction) does not actually vary, the acceleration in the third direction (gravity direction) seemingly is varied by the acceleration in the first direction (the acceleration in the direction different from the detection direction). Having the detection sensitivity for the direction different from the detection direction causes the detection accuracy of the physical quantity sensor to be lowered.

Although both the first rocking body and the second rocking body extend in the first direction, the tilted direction of the first rocking body is opposite to the titled direction of the second rocking body, and the absolute values of the rotation angles are the same as each other when the horizontal plane is used as reference. For example, the first rocking body is tilted in the clockwise direction by +θ with respect to the horizontal plane, but, in contrast, the second rocking body is tilted in the counterclockwise direction by −θ with respect to the horizontal plane. When acceleration in the first direction is applied and the inertial force works in the opposite direction thereto in this state, the apparent torque having the same magnitude occurs in each of the first region and the second region of the first rocking body, and the third region and the fourth region of the second rocking body. However, for example, the torque of the second region having the larger mass is dominant in the first rocking body, whereas, for example, the torque of the third region having the larger mass is dominant in the second rocking body, and thereby a rotation direction of the first rocking body and a rotation direction of the second rocking body due to the apparent torque are opposite to each other (the tilt of the rocking body is increased in one direction and the tilt of the rocking body is decreased in the other direction).

Therefore, according to the aspect, it is possible to remove errors caused by the detection sensitivity for directions other than the detection direction through the signal process. Accordingly, it is possible to further improve the detection accuracy of the physical quantity sensor using the seesaw structure.

As the base, an SOI (Silicon on Insulator) substrate may be used, or a semiconductor substrate having a multilayer wire structure, which is manufactured by a semiconductor manufacturing technique, may be used. In addition, as a covering body, a glass substrate or a silicon substrate (a single layer) may be used (if an insulating film is formed on the silicon substrate, electrodes may be formed on the silicon substrate). The first rocking body or the second rocking body can seesaw-rock, for example, by shifting a supporting axis from the center or by making the mass of one rocking body larger than the mass of the other rocking body.

(3) In another aspect of the physical quantity sensor of the invention, at least one of the first axis and the second axis may be parallel to a line passing through a center of the first rocking body or the second rocking body.

According to the aspect, the thicknesses in the cross-sectional shape of the first rocking body and the second rocking body are the same as each other, and thus it is possible to simplify a manufacturing process of the first rocking body and the second rocking body. In addition, the dimensions (width, length, and the like) of the shape of a first seesaw piece and a second seesaw piece in the plan view can be freely set, for example, by changing a mask shape for photolithography.

(4) In another aspect of the physical quantity sensor of the invention, at least one of the first region and the second region, or at least one of the third region and the fourth region may be provided with a mass portion.

According to the aspect, the seesaw rocking is made possible by making the mass of one rocking body larger than the mass of the other rocking body. The mass portion may be formed by a metal film or an insulating film. Thus, the mass portion may be removed by laser, etching, or the like, or a film may be formed by sputtering, deposition, or the like, thereby increasing or decreasing the mass in a simple manner. Therefore, a minute adjustment of the seesaw rocking can be simply performed.

(5) In another aspect of the physical quantity sensor of the invention, the second rocking body may have a shape in which the first rocking body is reversed with respect to an axis perpendicular to the arranged direction of the first region and the second region when viewed in plane.

In the aspect, the second rocking body has a structure in which the first rocking body is reversed, and thus it is possible to form the first rocking body and the second rocking body using the same mask pattern and to simplify the manufacturing process. In addition, a degree of rocking of the first rocking body and the second rocking body is the same as each other when being applied with acceleration in a predetermined direction, and thus the detection accuracy is further improved.

(6) In another aspect of the physical quantity sensor of the invention, the base may include a fifth region facing the first region, a sixth region facing the second region, a seventh region facing the third region, and an eighth region facing the fourth region when viewed in plan, and the fixed electrodes may be respectively formed on the fifth to eighth regions.

According to the aspect, since the fixed electrodes are individually provided to face the first movable electrode and the second movable electrode, it is possible to detect a differential capacitance value with high accuracy.

(7) In another aspect of the physical quantity sensor of the invention, the first movable electrode may be commonly formed to extend over the first region and the second region.

(8) In another aspect of the physical quantity sensor of the invention, the second movable electrode may be commonly formed to extend over the third region and the fourth region.

In the aspect, the first movable electrode or the second movable electrode is formed by a common electrode having the same potential. Due to the common use of the electrodes, it is possible to reduce the number of wires connected to the electrodes and simplify a wire pattern. For example, the conductive rocking body itself may be used as a common electrode having the ground potential. In this example, since the rocking body is commonly used as the electrode, it is not necessary to form electrodes separately, and thus the manufacturing process is simplified. In addition, the rocking body is constituted by a semiconductor substrate having a multilayer wire structure (also collectively referred to as a multilayer structure), and, for example, a metal layer which is a ground electrode may be formed on an uppermost interlayered insulating layer. In this example, it is possible to easily form the movable electrodes by a semiconductor manufacturing technique (multilayer wiring substrate technique).

(9) In another aspect of the physical quantity sensor of the invention, the first to fourth supporting portions may be formed using a torsion spring.

In the aspect, since the torsion spring is used in the first to fourth supporting portions, the rocking body has a strong restoring force against torsion deformation which occurs due to the seesaw rocking of the rocking body, and can thus prevent the supporting portions from being damaged. In addition, the torsion spring enables the behavior of the seesaw rocking to be large, and thus it is possible to improve the detection sensitivity.

(10) In another aspect of the invention, the physical quantity sensor may further include an opening portion provided in at least one of the first rocking body and the second rocking body; a movable weight portion disposed at the opening portion; a connection portion connecting the movable weight portion to the first rocking body or the second rocking body; a first arm shaped electrode portion formed to protrude toward the movable weight portion from the first rocking body or the second rocking body; and a second arm shaped electrode portion formed to protrude toward the first rocking body or the second rocking body from the movable weight portion and facing the first arm shaped electrode portion.

In the aspect, the rocking body functions as a detection plate for detecting a displacement in the gravity direction and also functions as a detection plate for detecting a displacement in directions other than the gravity direction. Thereby, it is possible to detect variations in capacitances corresponding to respective displacements in two different directions by the use of a single rocking body.

(11) In another aspect of the invention, the physical quantity sensor may further include a signal processing circuit performing a signal process based on detection signals, wherein the detection signals include a first detection signal which is varied based on a displacement between the first movable electrode of the first region and the fixed electrode, a second detection signal which is varied based on a displacement between the first movable electrode of the second region and the fixed electrode, a third detection signal which is varied based on a displacement between the second movable electrode of the third region and the fixed electrode, and a fourth detection signal which is varied based on a displacement between the second movable electrode of the fourth region and the fixed electrode, and wherein the signal processing circuit generates a first differential signal indicating a difference between the first detection signal and the second detection signal, generates a second differential signal indicating a difference between the third detection signal and the fourth detection signal, and generates an acceleration detection signal based on a signal obtained by adding the first differential signal to the second differential signal.

In the aspect, the signal processing circuit is provided, and performs a signal process for compensating detection errors based on signals obtained from the respective rocking bodies, thereby suppressing the detection errors.

The tilted direction of the first rocking body is opposite to the titled direction of the second rocking body, and the absolute values of the rotation angles are the same as each other when the horizontal plane is used as reference. For example, the first rocking body is tilted in the clockwise direction by $+\theta$ with respect to the horizontal plane, but, in contrast, the second rocking body is tilted in the counterclockwise direction by $-\theta$ with respect to the horizontal plane. When acceleration in a direction other than the gravity direction is applied and the inertial force works in the opposite direction thereto in this state, the apparent torque having the same magnitude occurs in each of the first region and the second region of the first rocking body, and the third region and the fourth region of the second rocking body. However, for example, the torque of the second region having the larger mass is dominant in the first rocking body, whereas, for example, the torque of the third region having the larger mass is dominant in the second rocking body, a rotation direction of the first rocking body and a rotation direction of the second rocking body due to the apparent torque are opposite to each other.

Here, as detection signals, the first detection signal which is varied based on the displacement of the first region of the first rocking body, the second detection signal which is varied based on the displacement of the second region of the first rocking body, the third detection signal which is varied based on the displacement of the third region of the second rocking body, and the fourth detection signal which is varied based on the displacement of the fourth region of the second rocking body, are output.

At this time, if a variation amount in the capacitance value of the variable capacitor (capacitor) caused by a displacement error, which is superposed on the first detection signal, resulting from the apparent torque is, for example, "$+\delta C$", a variation amount in the capacitance value relating to the second detection signal is "$-\delta C$", and, in the same manner, a variation amount in the capacitance value of the variable capacitor (capacitor) caused by a displacement error, which is superposed on the third detection signal, resulting from the apparent torque is "$+\delta C$", and a variation amount in the capacitance value relating to the fourth detection signal is "$-\delta C$".

In the signal processing circuit, when a first differential signal indicating a difference between the first detection signal and the second detection signal is generated, the variation amount in the capacitance value of the variable capacitor (capacitor) caused by a displacement error, which is superposed on the first differential signal, resulting from the apparent torque becomes "$2\delta C\ (=+\delta C-(-\delta C))$". In addition, when a second differential signal indicating a difference between the fourth detection signal and the third detection signal is generated, the variation amount in the capacitance value of the variable capacitor (capacitor) caused by a displacement error, which is superposed on the second differential signal, resulting from the apparent torque becomes "$-2\delta C\ (=-\delta C-(+\delta C))$". When the signal processing circuit adds the first differential signal to the second differential signal, the error component "$+2\delta C$" superposed on the first differential signal and the error component "$-2\delta C$" superposed on the second differential signal cancel each other out, and thus the error is removed. When the first differential signal is added to the second differential signal, the signal amplitude becomes twice as large. If this causes a problem, a signal process, for example, for decreasing the amplitude of a signal obtained by adding the first differential signal to the second differential signal by half may be appropriately performed.

In other words, the signal processing circuit can generate the first differential signal indicating the difference between the first detection signal and the second detection signal, generate the second differential signal indicating the difference between the third detection signal and the fourth detection signal, and generate the acceleration detection signal in the third direction, in which the error based on the acceleration in the first direction is suppressed, using the signal obtained by adding the first differential signal to the second differential signal.

In this way, according to the aspect, it is possible to remove the error caused by the detection sensitivity for directions other than the detection direction through the signal process. Therefore, it is possible to further improve the detection accuracy of the physical quantity sensor using the seesaw structure.

(12) One aspect of the invention is directed to a physical quantity sensor including a base; and a rocking body disposed over the base via a gap, wherein the rocking body includes a first supporting portion and a second supporting portion, is supported over the base by the first supporting portion and the second supporting portion which are disposed on a first axis, and is partitioned into a first region and a second region by the first axis when viewed in plan, where each of the first and second regions is provided with a movable electrode, wherein a fixed electrode is formed to face the movable electrode on the base, and wherein at least one of the first region and the second region is provided with a mass portion.

According to the aspect, the seesaw rocking is made possible by making the mass of one rocking body larger than the mass of the other rocking body. The mass portion may be formed by a metal film or an insulating film. Thus, the mass portion may be removed by laser, etching, or the like, or a film may be formed by sputtering, deposition, or the like, thereby increasing or decreasing the mass in a simple manner. Therefore, a minute adjustment of the seesaw rocking can be simply performed.

(13) In another aspect of the physical quantity sensor of the invention, the first axis may be parallel to a line passing through a center of the rocking body.

According to the aspect, for example, in a case where the area of the first region becomes larger than the area of the second region because the supporting axis of the rocking body is shifted, if the mass portion is formed on the first region, the seesaw rocking of the rocking body becomes more notable, thereby improving the detection sensitivity of a capacitor. On the other hand, if the mass portion is formed on the second region, it is possible to suppress the seesaw rocking of the rocking body. Thereby, it is possible to suppress the supporting portions supporting the rocking body from being twisted too greatly. Therefore, the supporting portions can be prevented from being damaged.

(14) One aspect of the invention is directed to an electronic apparatus including one of the above-described physical quantity sensors.

By using the physical quantity sensor according to the aspects, it is possible to implement the small-sized and high-performance electronic apparatus (a sensor unit including a plurality of sensors as an electronic apparatus, or a higher order electronic apparatus (for example, an FA apparatus) mounting the sensor unit thereon).

As such, according to at least one of the aspects of the invention, it is possible to improve the assembly property of the physical quantity sensor including, for example, a package.

BRIEF DESCRIPTION OF THE DRAWINGS

The invention will be described with reference to the accompanying drawings, wherein like numbers reference like elements.

FIGS. 5A to 5C are diagrams illustrating a configuration and an operation of a C/V conversion circuit.

FIGS. 11A to 11H are diagrams illustrating a signal processing method for further improving detection accuracy of a physical quantity sensor using a seesaw structure.

FIG. 16 is a diagram illustrating a configuration example of an electronic apparatus.

DESCRIPTION OF EXEMPLARY EMBODIMENTS

Hereinafter, preferred embodiments of the invention will be described in detail. The embodiments described below do not unduly limit the content of the invention set forth in the claims, and all the configurations described in the embodiments are not essential as solving means of the invention.

First Embodiment

FIGS. 1A to 1F are diagrams illustrating an example of a structure and an operation of a physical quantity sensor. The physical quantity sensor may be used as an inertial sensor, and, specifically, for example, may be used as an acceleration sensor (a capacitance type acceleration sensor, and a capacitance type MEMS acceleration sensor) for measuring acceleration (for example, gravitational acceleration) in a vertical direction (a direction perpendicular to a horizontal plane).

Figure 1A:
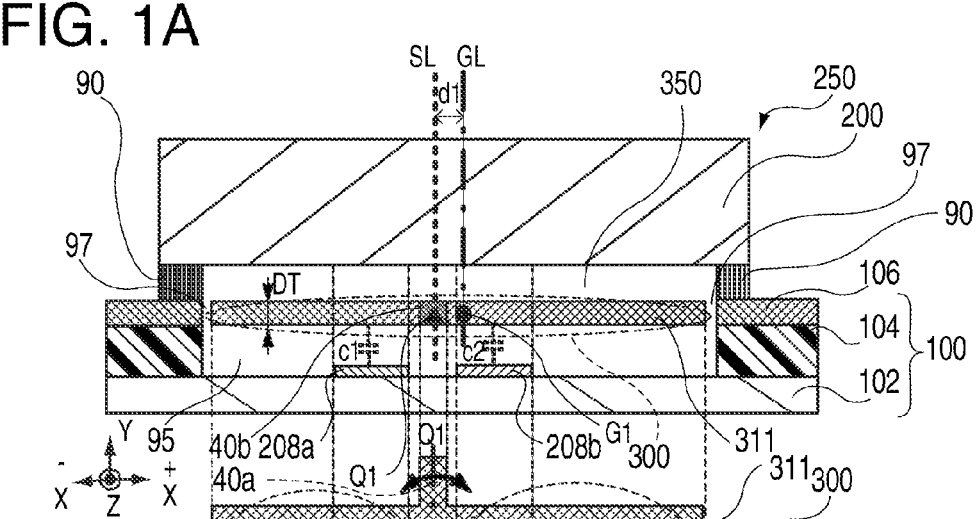
FIGS. 1A to 1F are diagrams illustrating an example of a structure and an operation of a physical quantity sensor.
Figure 1B:
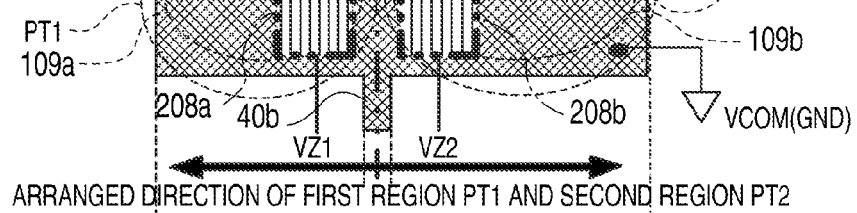
Figure 1C:
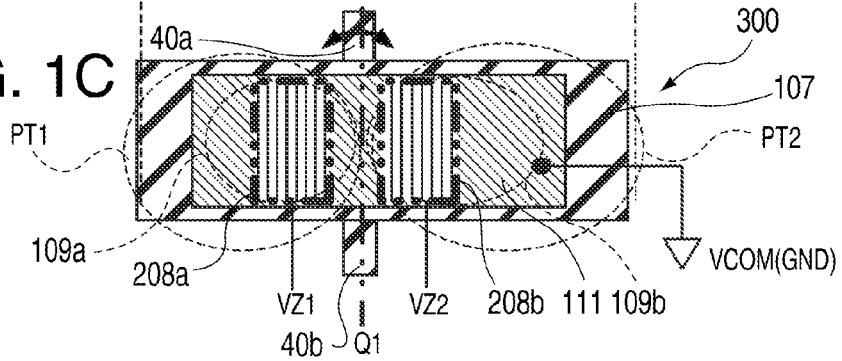
Figures 1D, 1E, 1F:
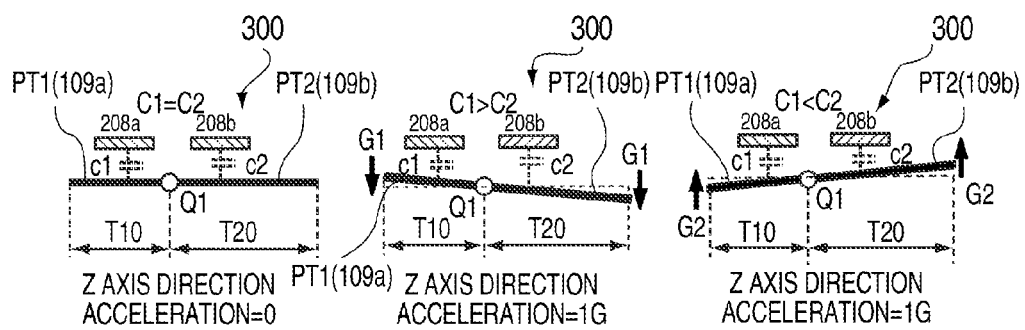

FIG. 1A shows a cross-sectional structure of the physical quantity sensor (including a package), and FIG. 1B is a plan view illustrating an example (an example of using a seesaw plate itself forming a rocking body as a movable electrode) of a structure when variable capacitors (capacitors, detection capacitors, or capacitive elements) for detecting a physical quantity such as acceleration are viewed in plan, wherein FIG. 1B corresponds to FIG. 1A. FIG. 1C is a plan view illustrating another example (an example of using a conductive layer formed on a multilayer structure as a movable electrode) of a structure when the variable capacitors are viewed in plan. FIGS. 1D to 1F are diagrams illustrating variations in capacitance values of the variable capacitors according to the seesaw operation of the rocking body.

The example shown in FIG. 1C is a modified example, and thus the fundamental example shown in FIGS. 1A and 1B will be first described.

Structure of Example Shown in FIGS. 1A and 1B

As shown in FIG. 1A, the physical quantity sensor (which is here a capacitance type acceleration sensor) includes a sealing body 250 which is constituted by a supporting body 100 and a covering body 200, a rocking body 300 provided in an inner space of the sealing body 250, a first supporting portion 40a (not shown in FIG. 1A, refer to FIGS. 1B and 1C) and a second supporting portion 40b which support the rocking body 300 at both sides so as to seesaw-rock (rock like a seesaw) about a supporting axis Q1, and variable capacitors (a first variable capacitor c1 and a second variable capacitor c2) having movable electrodes (a first movable electrode 109a and a second movable electrode 109b) which change their positions according to the seesaw rocking of the rocking body 300 and fixed electrodes (a first fixed electrode 208a and a second fixed electrode 208b) which are provided at positions facing the movable electrodes on a base 102.

The covering body 200 may not be formed, and, for example, the rocking body 300 may be used in a state of being exposed to air. The covering body 200 is provided in a case of requiring a hermetically sealed package.

The first supporting portion 40a functions as a first torsion spring and the second supporting portion 40b functions as a second torsion spring.

The first supporting portion 40a and the second supporting portion 40b function as torsion springs, thus have a strong restoring force relative to torsion deformation occurring in the spring due to the seesaw rocking of the rocking body 300, and can prevent the supporting portions from being damaged.

The first supporting portion (first torsion spring) 40a and the second supporting portion (second torsion spring) 40b are members for setting a position of the supporting axis Q1 which is a rotation center of the rocking body 300. The rocking body 300 can be fixed to the supporting body 100 (for example, a frame shaped part of the substrate 106 constituting the supporting body 100) or the covering body 200 via, for example, the first supporting portion (first torsion spring) 40a and the second supporting portion (second torsion spring) 40b.

As shown in FIG. 1A, in this embodiment, the supporting axis Q1 is provided on a line segment SL obtained by shifting the central line GL of the rocking body 300 by a predetermined distance d1 in parallel to the central line GL. In addition, the central line GL is a vertical line passing through the center G1 of the rocking body 300, and is marked with the thick chain line in FIG. 1A. The line segment SL is marked with the thick dotted line. As shown in FIG. 1B, the first supporting portion (first torsion spring) 40a and the second supporting portion (second torsion spring) 40b overlap with the supporting axis Q1. The extension direction of the first supporting portion (first torsion spring) 40a and the second supporting portion (second torsion spring) 40b corresponds with the extension direction of the supporting axis Q1.

As the supporting body 100, for example, an SOI (Silicon on Insulator) substrate may be used (the example shown in FIGS. 1A and 1B). In addition, as the covering body 200, a substrate made of silicon, glass, or the like may be used. In the modified example shown in FIG. 1C, a multilayer structure which is manufactured by a semiconductor manufacturing technique such as CMOS IC is used as the supporting body 100 (and the covering body 200).

In the example shown in FIGS. 1A and 1B, the supporting body 100 includes the base 102 (which is a base substrate of the SOI substrate and, for example, is made of Si), an insulating layer 104 (in some cases, the insulating layer is not used) on the base 102, and the substrate 106 formed on the insulating layer 104. Specifically, the substrate 106 may be a conductive active layer. In the following description, the substrate 106 is described as an active layer 106 in some cases.

A gap 95 is provided between the base 102 and the substrate 106. In addition, opening portions 97 are provided by removing a part of the substrate 106, and the rocking body 300 is disposed in the opening portions 97. Due to the presence of the opening portions 97 (and the gap 95) around the rocking body 300, the rocking body 300 can seesaw-rock.

The active layer 106 (the substrate 106) is etched by dry etching or the like until the insulating layer 104 is exposed, and then the insulating layer 104 is selectively isotropically etched by HF vapor or the like, thereby forming the rocking body 300 and the first supporting portion 40a and the second supporting portion 40b (torsion springs) which support the rocking body 300 at both sides.

The first supporting portion 40a and the second supporting portion 40b are connected to, for example, a frame shaped part (which is not shown in FIGS. 1A to 1F, and, for example, refer to FIG. 6) around the active layer 106 (the substrate 106). Therefore, the rocking body 300 is supported on the substrate (active layer) 106 (for example, the frame shaped part around it) by the first supporting portion 40a and the second supporting portion 40b disposed on the supporting axis Q1.

The rocking body 300 functions as the movable electrodes 109a and 109b. The rocking body 300 may be made of a conductive material (silicon or the like doped with impurities), thereby forming the movable electrodes 109a and 109b, or the movable electrodes 109a and 109b formed of a conductive layer such as metal may be formed on the rocking body 300. In the examples in FIGS. 1A to 1F, the rocking body 300 is made of a conductive material (silicon doped with impurities), thereby forming the movable electrodes 109a and 109b.

In addition, on the base 102, the fixed electrode 208a is provided at the position facing the movable electrode 109a, and the fixed electrode 208b is provided at the position facing the movable electrode 109b. In a case where the covering body 200 is provided, on the covering body 200, the fixed electrode 208a may be provided at the position facing the movable electrode 109a, and the fixed electrode 208b may be provided at the position facing the movable electrode 109b.

The rocking body 300 includes a first seesaw piece (first region) PT1 and a second seesaw piece (second region) PT2. The first seesaw piece (first region) PT1 corresponds to one (a part positioned at the left side in FIG. 1B) of two parts which are partitioned by the supporting axis Q1 when viewed in plan. The second seesaw piece (second region) PT2 corresponds to the other (a part positioned at the right side in FIG. 1B) of two parts which are partitioned by the supporting axis Q1 when viewed in plan.

The terms, the first region and the second regions are mainly used in reference to the shape of the rocking body 300 in the plan view (regions respectively corresponding to the seesaw pieces PT1 and PT2 divided into two parts by the supporting axis Q1). In the following description, the first seesaw piece (first region) PT1 and the second seesaw piece (second region) PT2 are disclosed in some cases.

In the example shown in FIG. 1B, the thickness of the first seesaw piece (first region) PT1 and the thickness of the second seesaw piece (second region) PT2 are both DT (however, the thicknesses of the seesaw pieces are not limited thereto, but may differ from each other due to adjustment of the torque). In addition, the first seesaw piece (first region) and the second seesaw piece (second region) are arranged in a direction horizontal (parallel) to the long side direction of the rocking body.

For example, when acceleration (for example, gravitational acceleration) in the vertical direction is applied to the rocking body 300, a torque (moment of force) occurs in each of the first seesaw piece (first region) PT1 and the second seesaw piece (second region) PT2. Here, in a case where the torque (for example, a counterclockwise torque) of the first seesaw piece (first region) PT1 and the torque (for example, a clockwise torque) of the second seesaw piece (second region) PT2 are balanced, there is no variation in the tilt of the rocking body 300, and thus variations in the acceleration cannot be detected. Therefore, for example, the rocking body 300 is designed such that when acceleration in the vertical direction is applied, the torque of the first seesaw piece (first region) PT1 and the torque of the second seesaw piece (second region) PT2 are not balanced, and the rocking body 300 has a predetermined tilt (a tilt in an allowable range). For example, a method may be used in which the supporting axis Q1 is disposed at a position shifted from the center of the rocking body 300 (a method in which distances from the supporting axis Q1 to the tip ends of the seesaw pieces PT1 and PT2 differ from each other), or a method may be used in which the supporting axis Q1 is disposed at the center of the rocking body 300, the thicknesses of the seesaw pieces PT1 and PT2 differ from each other, and thus the masses of the seesaw pieces PT1 and PT2 differ from each other. This embodiment employs the former method (in which the supporting axis Q1 is disposed at a position shifted from the center of the rocking body 300 and thus the distances between the supporting axis Q1 and the respective tip ends of the seesaw pieces PT1 and PT2 differ from each other).

The thicknesses in the cross-sectional shape of the first seesaw piece (first region) PT1 and the second seesaw piece (second region) PT2 are the same as each other (that is, both of them are set to the thickness DT), and thus it is possible to manufacture the first seesaw piece PT1 and the second seesaw piece PT2 at the same manufacturing process. In other words, there is an advantage in that a process (etching process) for giving different thicknesses to the seesaw pieces is not necessary, and the manufacturing process is simplified.

The dimensions (width, length, and the like) of the shape of the first seesaw piece PT1 and the second seesaw piece PT2 in the plan view can be freely set, for example, by changing a mask shape for photolithography. In the example shown in FIG. 1B, the rocking body 300 is processed to be rectangular when viewed in plan. In the following description, the longitudinal direction of the rocking body 300 is referred to as a first direction (X axis direction), the direction (also, referred to as a direction of the supporting axis Q1) perpendicular to the first direction in the horizontal plane is referred to as a second direction (Y axis direction), and the direction (the direction perpendicular to the horizontal plane) perpendicular to the first and second directions is referred to as a third direction (Z axis direction).

The movable electrodes 109 (the first movable electrode 109a and the second movable electrode 109b) provided in the rocking body 300 change their positions according to the seesaw rocking of the rocking body 300. For example, the conductive rocking body 300 itself may be used as movable electrodes, or electrodes made of a conductive material (metal or the like) may be selectively formed on the rocking body 300 or inside the rocking body 300, and the electrodes may be used as the movable electrodes (the first movable electrode 109a and the second movable electrode 109b).

In the example shown in FIG. 1B, the movable electrodes 109 (the first movable electrode 109a and the second movable electrode 109b) forming the variable capacitors c1 and c2 are constituted by the conductive rocking body 300 itself. Specifically, the movable electrodes 109 (the first movable electrode 109a and the second movable electrode 109b) are constituted (formed) by a seesaw plate (a silicon plate doped with impurities) 311 which is formed by patterning a conductive active layer. In other words, in the example shown in FIG. 1B, the movable electrodes 109 (the first movable electrode 109a and the second movable electrode 109b) are formed by a common electrode, and the common electrode is connected to a common potential (reference potential VCOM (for example, GND)). Due to the common use of the electrodes, it is possible to reduce the number of wires connected to the electrodes and simplify a wire pattern. In addition, since the rocking body 300 is commonly used as the electrodes, it is not necessary to form electrodes separately, and thus the manufacturing process is simplified.

The covering body 200 may be also formed on the SOI substrate in the same manner as the supporting body 100.

As described above, the base (a substrate, a base, or the like which becomes a foundation of a package) 100 and the covering body 200 constitute the sealing body. In order to form a hermetically sealed package using the supporting body 100 and the covering body 200, sealing members (for example, spacers) 90 may be used around the boundary between the supporting body 100 and the covering body 200.

On the surface of the base 102, the fixed electrodes 208 (the first fixed electrode 208a and the second fixed electrode 208b) forming the variable capacitors (capacitive elements) c1 and c2 are provided. It is preferable that an insulating film (not shown) is formed on the surface of the base 102, and the first fixed electrode 208a and the second fixed electrode 208b are formed on the insulating film. The first fixed electrode 208a and the second fixed electrode 208b are provided at positions corresponding to (positions facing) the movable electrodes 109 (the first movable electrode 109a and the second movable electrode 109b) provided in the rocking body 300. In addition, the first fixed electrode 208a and the second fixed electrode 208b may be provided at positions corresponding to (positions facing) the first movable electrode 109a and the second movable electrode 109b on the inner surface of the covering body 200.

The movable electrodes 109 are commonly used (that is, extending over the first region PT1 and the second region PT2), and thus it is possible to reduce the number of wires connected to the electrodes and simplify a wire pattern.

In the example shown in FIGS. 1A and 1B, the first movable electrode 109a and the second movable electrode 109b are commonly used, but the fixed electrodes 208 (the first fixed electrode 208a and the second fixed electrode 208b) may be commonly used by being set to the same potential (in this case, the first movable electrode 109a and the second movable electrode 109b are formed as electrodes which are electrically independent from each other). As described above, due to the common use of the electrodes, it is possible to reduce the number of wires connected to the electrodes and simplify a wire pattern.

In addition, the fixed electrodes are respectively provided to face the first movable electrode 109a and the second movable electrode 109b, and thereby it is possible to detect a differential capacitance value with high accuracy.

Next, the modified example shown in FIG. 1C will be described. In the example shown in FIG. 1C, the rocking body 300 is constituted by a semiconductor substrate having a multilayer wire structure (also collectively referred to as a multilayer structure). In other words, a multilayer structure where a plurality of insulating layers (including an interlayered insulating layer) are laminated is formed on the semiconductor substrate (corresponding to the reference numeral 102 in FIG. 1A) by a CMOS IC process. In the example shown in FIG. 1C, a metal layer 111 which is an electrode for the common potential (VCOM: here, GND) is formed on an insulating layer 107 positioned at the uppermost part. In the example shown in FIG. 1C, the movable electrodes 109 (the first movable electrode 109a and the second movable electrode 109b) can be easily formed by a semiconductor manufacturing technique (a multilayer wiring substrate technique or the like).

Figure 14:
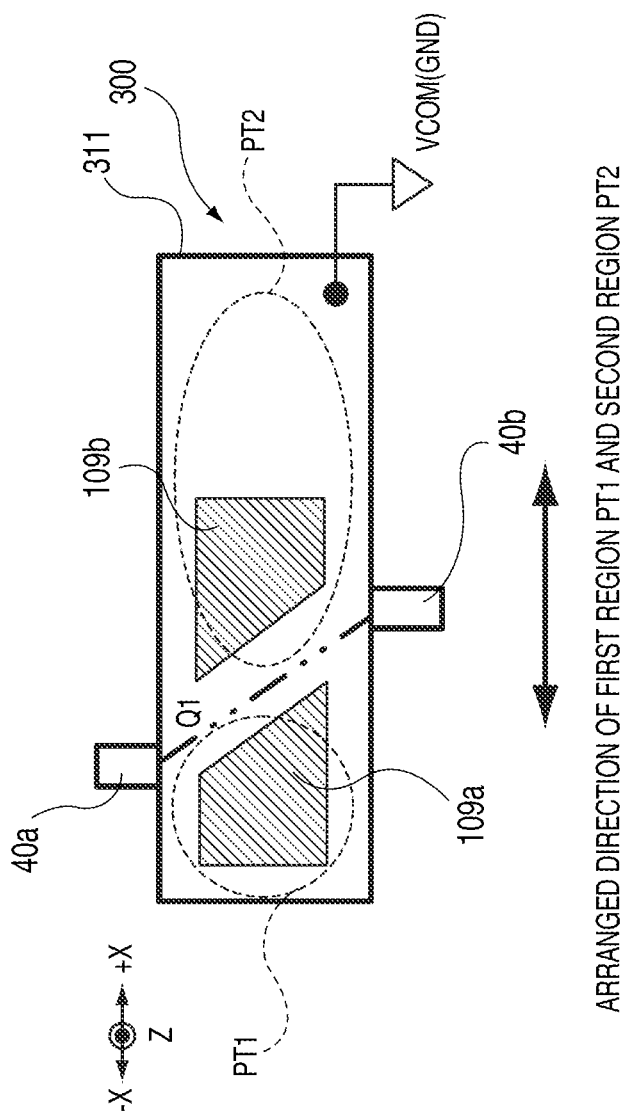
FIG. 14 is a diagram illustrating another example of a structure of the physical quantity sensor.

In addition to the above-described examples, other various modified examples are possible. An example of the modified examples is shown in FIG. 14. FIG. 14 is a diagram illustrating another example of a structure of the physical quantity sensor.

In the example shown in FIG. 14, the position of the first supporting portion 40a is different from the position of the second supporting portion 40b (they are shifted from each other by a predetermined distance in the longitudinal direction of the rocking body). In this case, the supporting axis Q1

(marked with the two-dot chain line in the figure) connecting the first supporting portion 40a to the second supporting portion 40b is on a slant, and the rocking body 300 is partitioned into the first region (first seesaw piece) PT1 and the second region (second seesaw piece) PT2 by the supporting axis Q1 when viewed in plan. Also, in this case, the first region PT1 and the second region PT2 are arranged in a direction horizontal (parallel) to the long side direction of the rocking body.

Here, referring to FIGS. 1A to 1F again, the description will be continued. Next, a rocking operation of the rocking body 300 and variations in capacitance values of the variable capacitors responding to the rocking operation will be described. Hereinafter, FIGS. 1D to 1F will be referred to. In FIGS. 1D to 1F, the first fixed electrode 208a and the second fixed electrode 208b are shown in the upper side of the rocking body 300 for convenience of description.

In FIG. 1D, the rocking body 300 maintains a horizontal state (this state corresponds to a state where there is no gravitational acceleration (gravity-free state)). As shown in FIG. 1D, the first variable capacitor c1 and the second variable capacitor c2 are provided as the variable capacitors. The first variable capacitor c1 includes the first movable electrode 109a of which the position varies according to the seesaw rocking of the first seesaw piece PT1, and the first fixed electrode 208a which is provided at the position facing the first movable electrode 109a on the covering body 200. In addition, the second variable capacitor c2 includes the second movable electrode 109b of which the position is varied due to the seesaw rocking of the second seesaw piece PT2, and the second fixed electrode 208b which is provided at the position of the covering body 200 facing the second movable electrode 109b.

If the first variable capacitor c1 and the second variable capacitor c2 are used as the variable capacitors (detection capacitors), there is an advantage in that not only the magnitude of acceleration but also the direction of the acceleration can be detected (however, the invention is not limited thereto).

In FIG. 1D, the distance between the supporting axis Q1 and the tip end of the first seesaw piece PT1 is T10, and the distance between the supporting axis Q1 and the tip end of the second seesaw piece PT2 is T20 (>T10). Therefore, in the example shown in FIG. 1D, for example, when vertically downward acceleration occurs, the torque occurring in the second seesaw piece PT2 is larger than the torque occurring in the first seesaw piece PT1, and thus the rocking body 300 rotates in the clockwise direction. Hereinafter, this will be described in detail with reference to FIGS. 1E and 1F.

In the state shown in FIG. 1E, for example, the gravitational acceleration G1 (=1G) is applied to the rocking body 300. Thereby, the rocking body 300 (the first seesaw piece PT1 and the second seesaw piece PT2) rotates in the clockwise direction, and thus the rocking body 300 is tilted. The distance between the electrodes of the first variable capacitor c1 is reduced due to the seesaw rocking of the rocking body 300, and thus the capacitance value C1 of the first variable capacitor c1 is increased. On the other hand, the capacitance value C2 of the second variable capacitor c2 is reduced due to the increase in the distance between the electrodes. In this way, in the example shown in FIG. 1E, a differential detection output can be obtained. It is possible to detect the value (=1G) of the gravitational acceleration G1 using a degree of variations in two output signals. In addition, it is possible to specify the direction (vertically downward) of the acceleration using directions of variations in the two output signals.

In the state in FIG. 1F, vertically upward acceleration G2 is further applied to the rocking body 300 in the state where the gravitational acceleration (=1G) is applied to the rocking body 300. In this case, the rocking body 300 (the first seesaw piece PT1 and the second seesaw piece PT2) rotates in the counterclockwise direction, and the rocking body 300 is tilted to be opposite to the case in FIG. 1E. The distance between the electrodes of the first variable capacitor c1 is increased due to the seesaw rocking of the rocking body 300, and thus the capacitance value C1 of the first variable capacitor c1 is decreased. On the other hand, the capacitance value C2 of the second variable capacitor c2 is increased due to the decrease in the distance between the electrodes.

By using the detection signals (that is, the magnitude and the direction of the gravitational acceleration) obtained from the state in FIG. 1E as a reference, detection signals obtained from the state in FIG. 1F are determined, and thus it can be detected to what degree the acceleration acts in which direction in the state in FIG. 1F. In other words, it is possible to detect a value of the applied acceleration G2 by the degree of the variations in two respective output signals, based on the two output signals (differential signals) obtained from the state in FIG. 1F. In addition, by detecting directions of the variations in the two respective output signals, it is possible to specify the direction (vertically upward) of the acceleration G2.

For example, in a case of measuring vertical acceleration, a main surface (bottom surface) of the supporting body 100 forming the sealing body (package) of the physical quantity sensor is fixed onto, for example, a horizontal surface of an electronic component or the like in which the package is installed. For example, if the gravitational acceleration is applied, the tilt of the rocking body 300 is varied in response to the torque, and thereby the capacitance values of the variable capacitors c1 and c2 are varied. Therefore, for example, it is possible to detect the gravitational acceleration as an electrical signal indicating variations in the capacitance values of the variable capacitors (capacitive elements).

As described above, the physical quantity sensor may be used as an inertial sensor such as an acceleration sensor or a gyro sensor, and, specifically, for example, may be used as a capacitance type acceleration sensor for measuring acceleration (for example, gravitational acceleration) in the vertical direction (a direction perpendicular to the horizontal plane). In a case of measuring vertical acceleration, a main surface (bottom surface) of the base forming the sealing body (package) of the physical quantity sensor is fixed onto, for example, a horizontal surface of an electronic component or the like in which the package is installed. For example, if the gravitational acceleration is applied, the tilt of the rocking body 300 is varied in response to the torque, and thereby the capacitance values of the variable capacitors c1 and c2 are varied. Therefore, it is possible to detect, for example, the magnitude and the direction of the gravitational acceleration as an electrical signal indicating variations in the capacitance values of the variable capacitors c1 and c2.

According to the examples shown in FIGS. 1A to 1F, for example, the rocking body 300, which is supported to seesaw-rock by the first supporting portion (first torsion spring) 40a and the second supporting portion (second torsion spring) 40b, is formed on the supporting body 100, the covering body 200 is placed at a predetermined position, and the supporting body 100 and the covering body 200 are sealed by, for example, a sealing material (an adhesive material or the like), thereby efficiently forming the sealing body (for example, a hermetically sealed package). At this time, since the covering body 200 is fixed to the supporting body 100, the positions of the fixed electrodes 208a and 208b forming the variable capacitors c1 and c2 are automatically set, and thus a seesaw type physical quantity sensor is automatically formed.

In addition, since the main surface of the covering body 200 is fixed so as to be horizontal, the parallelism between the surface of the supporting body 100 and the main surface (including the inner surface) of the covering body 200 is secured, and thus the distance (a distance when the rocking body 300 is in a horizontal state) between the electrodes of the parallel plate capacitor (variable capacitors) c1 and c2 is also set with high accuracy. Therefore, it is possible to improve the assembly property of the physical quantity sensor including the sealing body (package).

Example of Sealing Structure of Sealing Body

Figure 2A:
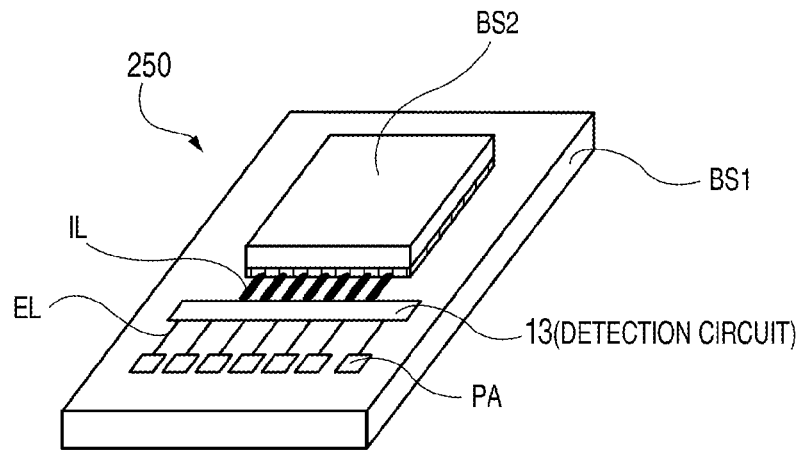
FIGS. 2A and 2B are diagrams illustrating an example of a structure of a sealing body.
Figure 2B:
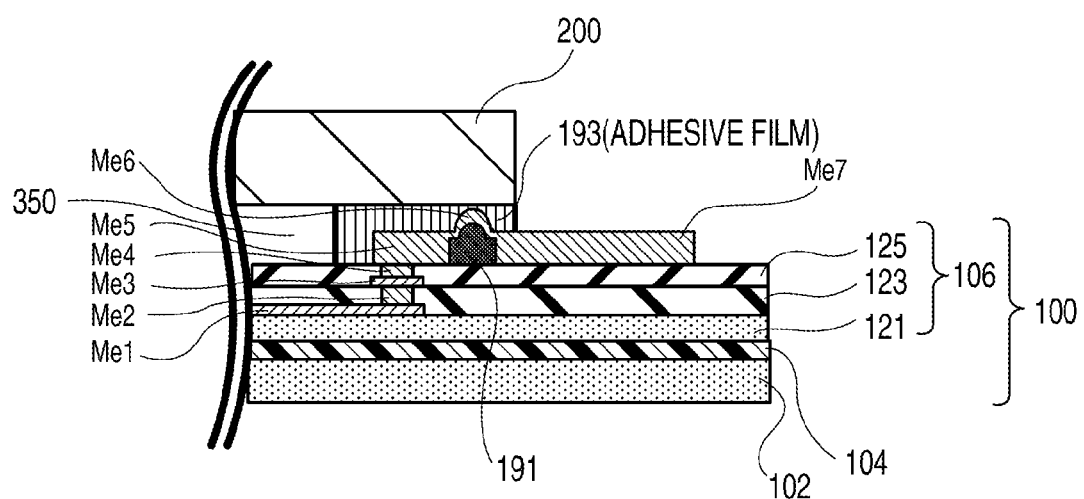

FIGS. 2A and 2B are diagrams illustrating an example of a structure of the sealing body. FIG. 2A is a perspective view illustrating an entire configuration of the sealing body, and FIG. 2B is a diagram illustrating an example of a cross-sectional structure of a connection portion of the base and the covering body.

As shown in FIG. 2A, the covering body 200 is fixed onto the supporting body 100, thereby forming the sealing body (here, a hermetically sealed package) 250. On the surface of the base BS1, pads (external connection terminals) PA, a detection circuit 13, wires EL and wires IL are provided. The variable capacitors c1, c2, and the like provided inside the sealing body are connected to the detection circuit 13 via the wires IL. The detection circuit 13 is connected to the pads PA via the wires EL. In a case where a plurality of sensors is installed inside the sealing body, an output signal from each sensor is sent to the detection circuit 13 via the wires IL. In addition, in the example shown in FIG. 2A, the detection circuit (including a signal processing circuit) 13 is mounted on the base BS1 (however, this is only an example, and is not limited to this example). It is possible to implement a high-performance inertial sensor (MEMS inertial sensor) having, for example, a signal processing function, by mounting the detection circuit 13 on the base BS1.

Next, with reference to FIG. 2B, a cross-sectional structure example of the connection portion of the base and the covering body will be described. As described above, the supporting body 100 includes the silicon substrate (base substrate) 102, the insulating layer 104, and the active layer 106. The active layer 106 includes, for example, a silicon layer 121 doped with impurities, and two-layer insulating layers 123 and 125.

On the other hand, the covering body 200 may be formed of, for example, a glass substrate (a single layer), or may be formed of a silicon substrate (a single layer) in which an insulating film is formed on the surface. In a case where other sensor elements are formed, or other circuits are formed on the covering body side, an SOI substrate having the same configuration as the supporting body 100 may be used to form the covering body 200.

The wire Me1 (the first floor wire), which is extracted from the variable capacitors provided inside the sealing body, is connected to the wire Me1 provided on the supporting body 100 via the contact plug Me2, the second floor wire Me3, the contact plug Me4, the third floor wire Me5, and the wire Me6 having a mountain-shaped mound shape. In addition, in FIG. 2B, the reference numeral 191 denotes a spacer member (for example, a resin member). The provided spacer member 191 enables the parallelism between the supporting body 100 and the covering body 200 mounted on the supporting body 100 to be maintained with higher accuracy. The reference numeral 193 denotes an adhesive film. The spacer 191 and the adhesive film 193 function as the sealing material 90.

Example of Manufacturing Method of Sealing Body

FIGS. 3A to 3D are diagrams illustrating an example of a manufacturing method of the sealing body. In this example, the sealing body is formed by joining two SOI substrates to each other.

Figure 3A:
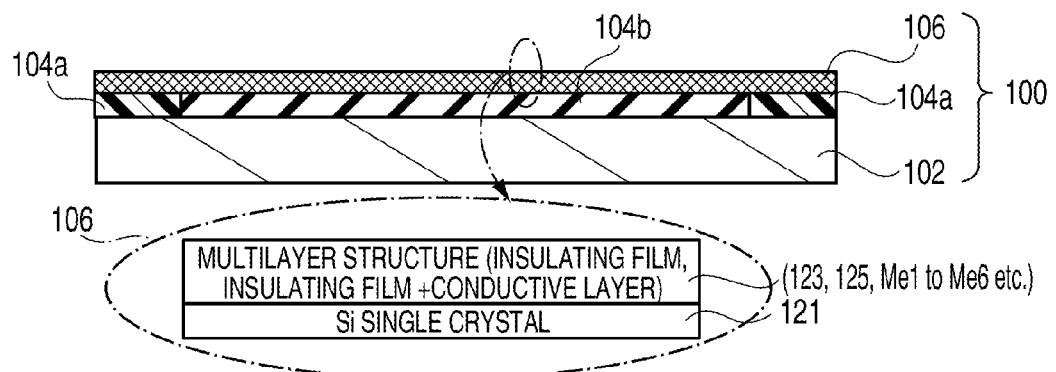
FIGS. 3A to 3D are diagrams illustrating an example of a manufacturing method of the sealing body.

As shown in FIG. 3A, an SOI substrate which is the supporting body 100 is prepared. In addition, a metal layer as the fixed electrodes 208a and 208b (not shown in FIGS. 3A to 3C, refer to FIG. 3D) is formed on the base 102.

As marked with and surrounded by the chain line at the lower part of FIG. 3A, the active layer (substrate) 106 includes a silicon single crystal 121, and a multilayer structure (in some cases, including a plurality of insulating layers 123 and 125, and conductive layers Me1 to Me6) formed on the silicon single crystal 121. The silicon single crystal 121 is doped with an impurity (for example, As or the like which is an N type impurity) at high concentration. Therefore, the silicon single crystal 121 (the first seesaw piece PT1 and the second seesaw piece PT2) itself may be used as the movable electrodes 109a and 109b shown in FIGS. 1A to 1F.

Figure 3B:
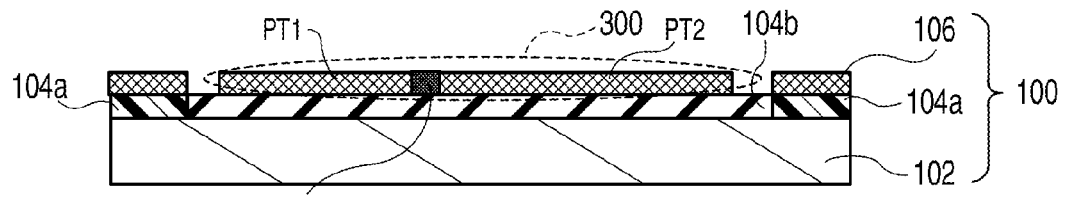

Next, as shown in FIG. 3B, the active layer (substrate) 106 is patterned by photolithography, thereby forming the rocking body 300 (the first seesaw piece PT1 and the second seesaw piece PT2), the first supporting portion 40a, and the second supporting portion 40b.

Figure 3C:
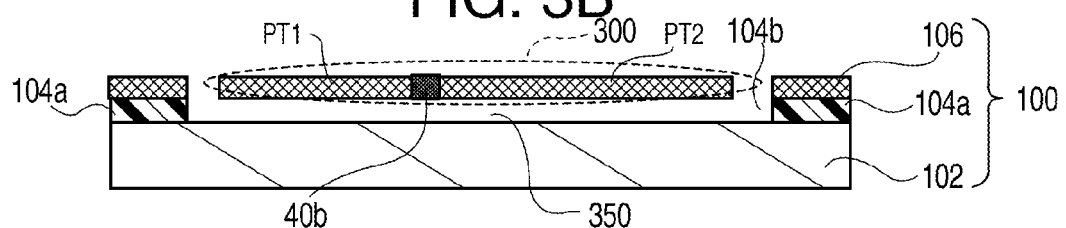

Next, as shown in FIG. 3C, the insulating layer 104b which is a sacrifice layer is removed by HF vapor or wet etching. Thereby, a hollow portion 350 (including the gap 95 and the opening portions 97 shown in FIG. 1A to 1F) is formed around the rocking body 300. The rocking body 300 is supported to seesaw rock by the first supporting portion (first torsion spring) 40a and the second supporting portion (second torsion spring) 40b on the hollow portion 350.

Figure 3D:
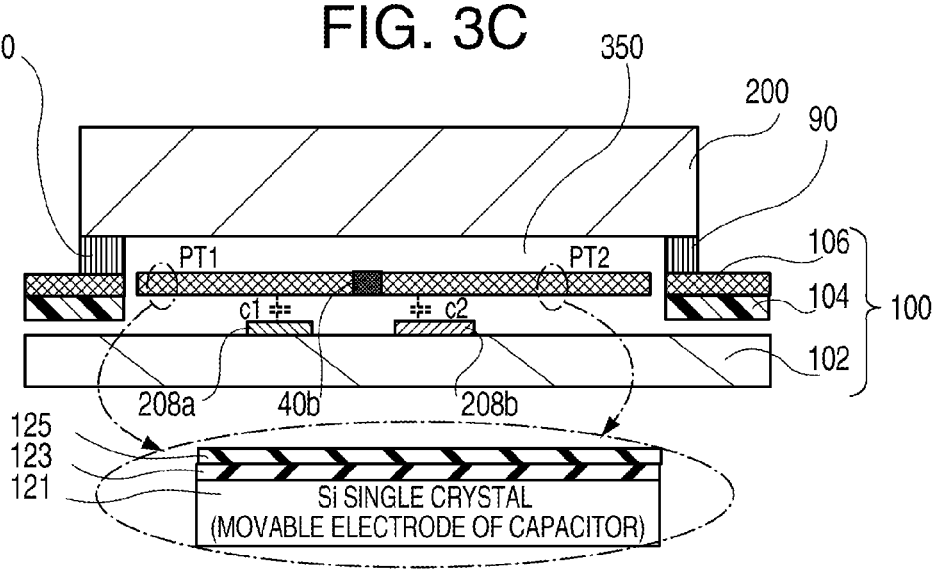

Thereafter, as shown in FIG. 3D, the covering body 200 is mounted on the SOI substrate as the supporting body 100 via the sealing material 90. Further, the first fixed electrode 208a and the second fixed electrode 208b (which are all made of a metal layer made of Al or the like) are formed on the base 102. The first fixed electrode 208a and the second fixed electrode 208b are respectively provided at positions facing the first seesaw piece PT1 and the second seesaw piece PT2 as the movable electrodes on the active layer 106 (on the uppermost insulating layer).

As shown in FIG. 3D, each of the first seesaw piece PT1 and the second seesaw piece PT2 as the movable electrodes includes the Si single crystal 121 as an electrode material and the two-layer insulating layers (for example, a CVD $SiO_2$ layer) 123 and 125 formed on the Si single crystal layer, as shown in the lower part of FIG. 3D. The insulating layers 123 and 125 function as a dielectric film of the capacitor, and also function as a protective film of the movable electrodes (in a case where the movable electrodes and the fixed electrodes come into contact with each other, they prevent the electrodes from being damaged).

Second Embodiment

Figure 4A:
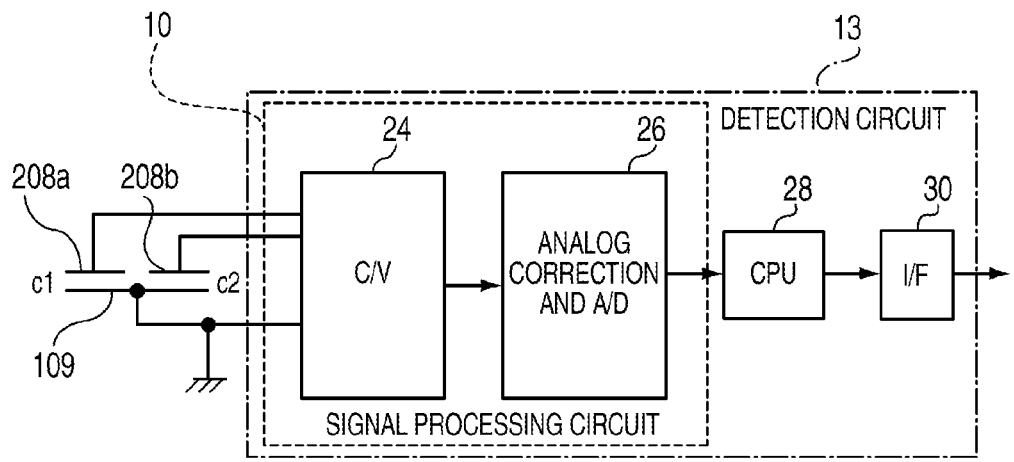
FIGS. 4A to 4C are diagrams illustrating a configuration example of a detection circuit.
Figure 4B:
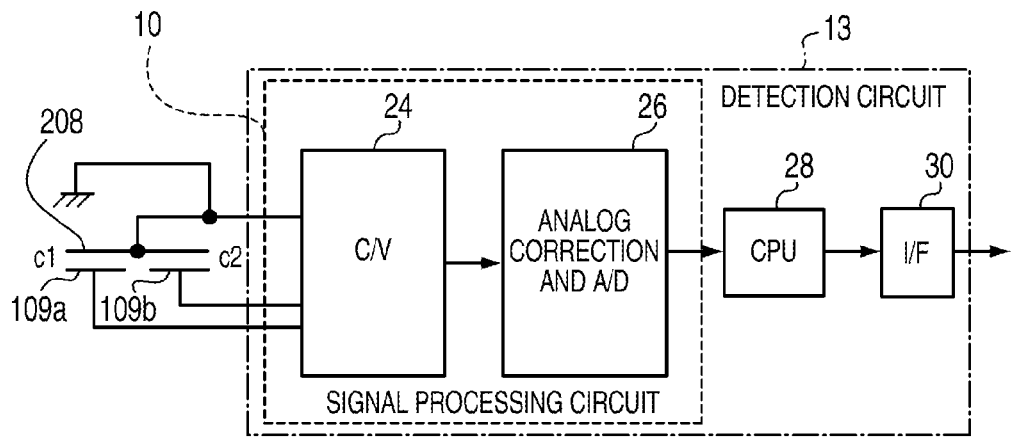
Figure 4C:
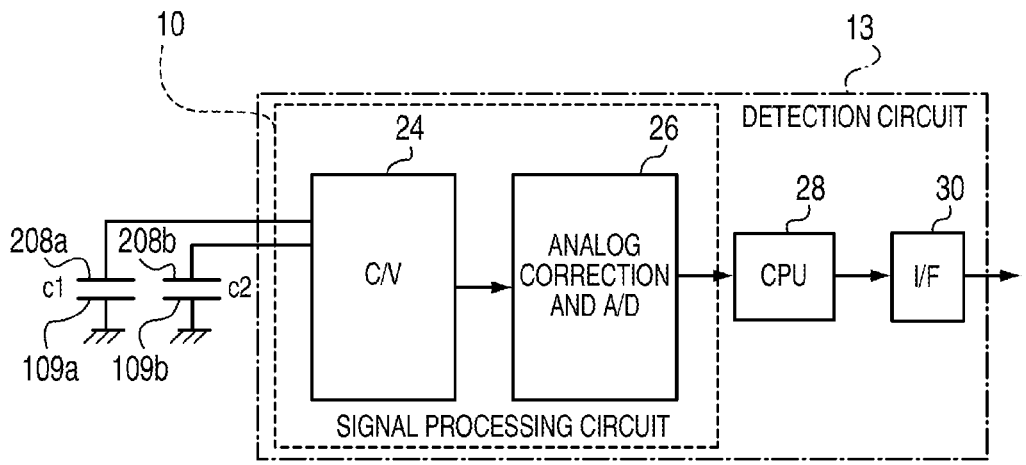

Configuration examples of the detection circuit will be described in this embodiment. FIGS. 4A to 4C are diagrams illustrating configuration examples of the detection circuit. The detection circuit 13 is provided in, for example, an empty space on the supporting body 100 and embeds a signal processing circuit 10 therein, as described with reference to FIG. 2A. In the example shown in FIG. 4A, the first variable capacitor c1 and the second variable capacitor c2 included in the physical quantity sensor (here, a capacitance type acceleration sensor) have the first fixed electrode 208a, the second fixed electrode 208b, and the movable electrode 109 which is a common ground electrode.

The detection circuit 13 includes the signal processing circuit 10, a CPU 28, and an interface circuit 30. The signal processing circuit 10 has a C/V conversion circuit (capacitance value/voltage conversion circuit) 24, and an analog correction and A/D conversion circuit 26. However, this is only an example, and the signal processing circuit 10 may include the CPU 28 or an interface circuit (I/F) 30.

In the example shown in FIG. 4B, the first variable capacitor c1 and the second variable capacitor c2 have the fixed electrode 208 which is a common ground electrode, the first movable electrode 109a, and the second movable electrode 109b. The configuration of the detection circuit 13 is the same as that of the example shown in FIG. 4A. In addition, in the example shown in FIG. 4C, the first variable capacitor c1 and the second variable capacitor c2 have the first fixed electrode 208a, the second fixed electrode 208b, and the first movable electrode 109a and the second movable electrode 109b which have the ground potential. The configuration of the detection circuit 13 is the same as that of the example shown in FIG. 4A.

Configuration Example of C/V Conversion Circuit

Here, an example of a configuration and an operation of the C/V conversion circuit (C/V conversion amplifier) will be described with reference to FIGS. 5A to 5C. FIGS. 5A to 5C are diagrams illustrating a configuration and an operation of the C/V conversion circuit.

FIG. 5A is a diagram illustrating a fundamental configuration of a C/V conversion amplifier (charge amplifier) using a switched capacitor, and FIG. 5B is a diagram illustrating voltage waveforms of respective parts of the C/V conversion amplifier shown in FIG. 5A.

As shown in FIG. 5A, the fundamental C/V conversion circuit 24 includes a first switch SW1 and a second switch SW2 (which constitute a switched capacitor of an input portion along with the variable capacitor c1 (or c2)), an operational amplifier (OPA) 1, a feedback capacitor Cc (integrating capacitor), a third switch SW3 for resetting the feedback capacitor Cc, a fourth switch SW4 for sampling an output voltage Vc from the operational amplifier (OPA) 1, and a holding capacitor Ch.

Also, as shown in FIG. 5B, the first switch SW1 and the third switch SW3 are controlled to be turned on and off by first in-phase clocks, and the second switch SW2 is controlled to be turned on and off by second clocks having a phase reverse to the first clocks. The fourth switch Sw4 is briefly turned on at the end of the period where the second switch SW2 is turned on. When the first switch SW1 is turned on, a predetermined voltage Vd is applied to both ends of the variable capacitor c1 (c2), and charge is accumulated in the variable capacitor c1 (c2). At this time, the feedback capacitor Cc is in a reset state (both ends are short-circuited) since the third switch SW3 is turned on. Next, when the first switch SW1 and the third switch SW3 are turned off and the second switch SW2 is turned on, both the ends of the variable capacitor c1 (c2) are applied with the ground potential together, and thus the charge accumulated in the variable capacitor c1 (c2) moves toward the operational amplifier (OPA) 1. At this time, since the charge amount is conserved, $Vd \cdot C1(C2) = Vc \cdot Cc$ is established, and thus the output voltage Vc from the operational amplifier (OPA) 1 becomes $(C1/Cc) \cdot Vd$. In other words, the gain of the charge amplifier is determined by a ratio of the capacitance value (C1 or C2) of the variable capacitor c1 (or c2) and the capacitance value of the feedback capacitor Cc. Next, when the fourth switch (sampling switch) SW4 is turned on, the output voltage Vc from the operational amplifier (OPA) 1 is held by the holding capacitor Ch. The held voltage is Vo, and the voltage Vo becomes an output voltage from the charge amplifier.

As described above, the C/V conversion circuit 24 actually receives differential signals from the two variable capacitors (the first variable capacitor c1 and the second variable capacitor c2). In this case, as the C/V conversion circuit 24, for example, as shown in FIG. 5C, a charge amplifier having the differential configuration may be used. In the charge amplifier shown in FIG. 5C, a first switched capacitor amplifier (SW1a, SW2a, OPA1a, Cca, and SW3a) for amplifying a signal from the first variable capacitor c1, and a second switched capacitor amplifier (SW1b, SW2b, OPA1b, Ccb, and SW3b) for amplifying a signal from the second variable capacitor c2 are provided at the input stage. In addition, output signals (differential signals) from the operational amplifiers (OPA) 1a and 1b are input to the differential amplifier (OPA2, and resistors R1 to R4) provided at the output stage.

As a result, the amplified output signal Vo is output from the operational amplifier (OPA) 2. By the use of the differential amplifier, it is possible to achieve an effect where base noise (common mode noise) can be removed. The configuration of the C/V conversion circuit 24 described above is only an example, and the invention is not limited to the configuration.

Third Embodiment

In this embodiment, an example of a capacitance type sensor capable of detecting accelerations in two different directions will be described. In the following description, a capacitance type acceleration sensor will be described.

In this embodiment, acceleration in the Z axis direction is detected based on capacitance value variations, caused by the seesaw rocking of the rocking body, in a variable capacitor for detecting acceleration in the Z axis direction. In addition, the rocking body also has a variable capacitor for detecting acceleration in the X axis direction or the Y axis direction, and acceleration in the X axis direction or the Y axis direction can be detected based on capacitance value variations in the variable capacitor for detecting acceleration in the X axis direction or the Y axis direction.

Figure 6:
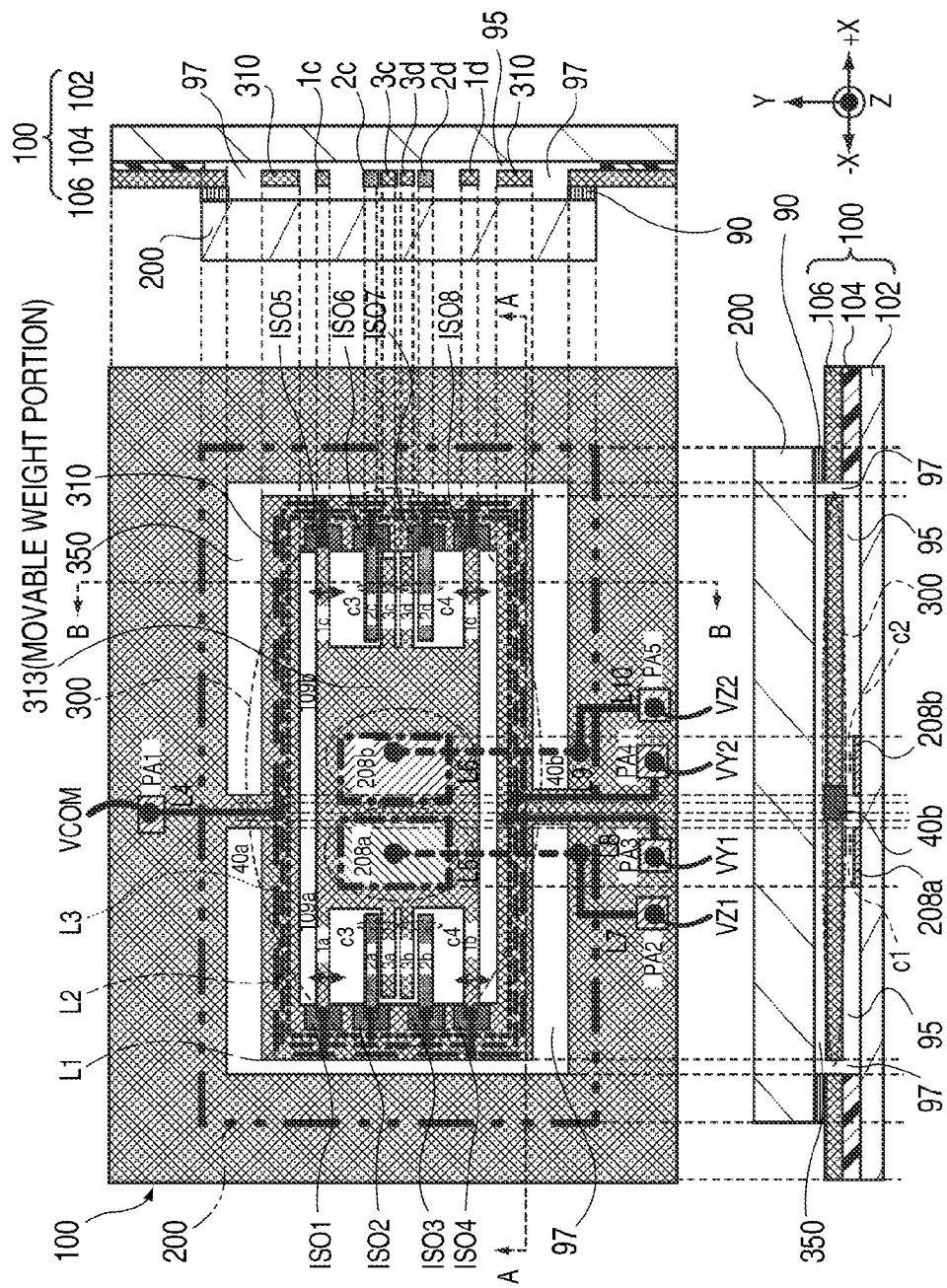
FIG. 6 is a diagram illustrating a configuration example of a physical quantity sensor (acceleration sensor) which can detect accelerations in two different directions.

FIG. 6 is a diagram illustrating an example of a configuration of an acceleration sensor which can detect accelerations in two different directions. FIG. 6 shows a plan view of the sealing body including the supporting body 100 and the covering body 200, a cross-sectional view in the longitudinal direction (lengthwise direction), and a cross-sectional view in the direction (widthwise direction) perpendicular to the longitudinal direction. The cross-sectional view in the longitudinal direction (lengthwise direction) is a view taken along the line A-A of the plan view. The cross-sectional view in the direction (widthwise direction) perpendicular to the longitudinal direction is a view taken along the line B-B of the plan view.

In the plan view of FIG. 6, the covering body 200 is marked with the thick chain line. Also, the plan view of FIG. 6 shows an arrangement example of electrodes, wires, and pads (external connection terminals).

First, directions in the three-dimensional space are defined, and extension directions of the respective portions of the acceleration sensor or directions of displacements of the movable electrodes forming the variable capacitors are clarified. In other words, the longitudinal direction of the rocking body in the horizontal plane (also referred to as a plane including the main surface of the rocking body 300) is referred to as a first direction (X axis direction) when the rocking body 300 is in the horizontal state. The direction (that is, the direction perpendicular to the horizontal plane) perpendicular to the first direction (X axis direction) in the horizontal plane is referred to as a second direction (Y axis direction), and the direction perpendicular to each of the first direction (X axis direction) and the second direction (Y axis direction) is referred to as a third direction (Z axis direction). The X axis direction includes the positive X axis direction (+X) and the negative X axis direction (−X). This is also the same for the Y axis direction and the Z axis direction.

In the example shown in FIG. 6, in the same manner as the example shown in FIGS. 1A to 1F, the rocking body 300 is supported to seesaw-rock at both sides by the first supporting portion 40a and the second supporting portion 40b. The first supporting portion 40a is formed by a first torsion spring extending in the second direction (Y axis direction), and the second supporting portion 40b is formed by a second torsion spring extending in the second direction (Y axis direction). One end of the first torsion spring (first supporting portion) 40a is connected (fixed) to the rocking body 300, and the other end of the first torsion spring 40a is connected (fixed) to the supporting body 100 or the covering body 200. In the same manner, one end of the second torsion spring (second supporting portion) 40b is connected (fixed) to the rocking body 300, and the other end of the second torsion spring 40b is connected (fixed) to the supporting body 100 or the covering body 200. The first torsion spring 40a and the second torsion spring 40b respectively extend in the second direction (Y axis direction). For example, each of the first torsion spring 40a and the second torsion spring 40b is provided to extend in the second direction (Y axis direction) so as to overlap with the supporting axis Q1 of the rocking body 300 when viewed in plan.

The distance in the third direction (Z axis direction) (the distance between the electrodes) between the first movable electrode 109a and the second movable electrode 109b (in the example shown in FIG. 6, the rocking body itself functions as the movable electrode having the common potential) and the first fixed electrode 208a and the second fixed electrode 208b, which form the variable capacitors c1 and c2, is varied due to the seesaw rocking of the rocking body 300. In other words, it is possible to detect acceleration (gravitational acceleration) in the Z axis direction (vertical direction) by the use of the seesaw rocking of the rocking body 300.

In the example shown in FIG. 6, the rocking body 300 is also provided with capacitors (a third capacitor c3 and a fourth capacitor c4) for detecting acceleration in the second direction (Y axis direction). The third capacitor c3 and the fourth capacitor c4 are formed by comb electrodes. Hereinafter, this will be described in detail.

As shown in FIG. 6, the rocking body 300 also includes a frame 310 which is connected to the first torsion spring 40a as the first supporting portion and the second torsion spring 40b as the second supporting portion; a movable weight portion 313 which is connected to the frame 310 via second direction displacement springs (also referred to as connection portions) 1a, 1b, 1c and 1d which can be displaced in the second direction (Y axis direction) and around which the hollow portion 350 is formed; fixed electrode portions (also referred to as first arm shaped electrode portions) 2a, 2b, 2c and 2d which are formed to protrude toward the hollow portion 350 (or the movable weight portion 313) from the frame 310; and movable electrode portions (also referred to as second arm shaped electrode portions) 3a, 3b, 3c and 3d which are formed to protrude toward the rocking body 300 (the frame 310 thereof) from the movable weight portion 313, integrally displaced with the movable weight portion 313, and face the fixed electrode portions (first arm shaped electrode portions) 2a, 2b, 2c and 2d. The fixed electrode portions 2a, 2b, 2c and 2d and the movable electrode portions 3a, 3b, 3c and 3d are respectively formed by comb electrodes, and each of the electrodes extends in the first direction (X axis direction).

In other words, the rocking body 300 has the opening portions 97 (for example, which are formed by removing the active layer 106 which is a substrate by the etching), and the movable weight portion 313 is disposed on the opening portions 97. Also, the connection portions (the second direction displacement spring portions or the elastic modification portions) 1a, 1b, 1c and 1d for connecting the movable weight portion 313 to the rocking body 300 are provided. Further, the first arm shaped electrode portions (fixed electrode portions) 2a, 2b, 2c and 2d which are formed to protrude toward the movable weight portion 313 from the rocking body 300 (the frame 310 thereof), and the second arm shaped electrode portions (movable electrode portions) 3a, 3b, 3c and 3d, which are formed to protrude toward the rocking body 300 from the movable weight portion 313 and face the first arm shaped electrode portions (fixed electrode portions) 2a, 2b, 2c and 2d, are provided.

The second direction displacement spring portions 1a, 1b, 1c and 1d are respectively electrically insulated from the frame 310 by isolation regions ISO1, ISO4, ISO5 and ISO8. In the same manner, the fixed electrode portions 2a, 2b, 2c and 2d are respectively electrically insulated from the frame 310 by the isolation regions ISO2, ISO3, ISO6 and ISO7. Each of the isolation regions ISO1 to ISO8 is formed by, for example, filling an insulating film such as $SiO_2$ in a depressed portion which is partially provided at the silicon single crystal.

When the second direction displacement spring portions 1a, 1b, 1c and 1d are displaced in the second direction (Y axis direction) by acceleration in the second direction (Y axis direction), the distances between the fixed electrode portions 2a, 2b, 2c and 2d and the movable electrode portions 3a, 3b, 3c and 3d vary, and capacitance values of the third capacitor c3 and the fourth capacitor c4 vary. The variations in the capacitance values are detected as variations in micro electric signals (current signals), and thereby it is possible to detect acceleration in the second direction (Y axis direction).

The second direction displacement spring portions 1a, 1b, 1c and 1d are, for example, bar shaped springs which extend in a straight line shape in the first direction (X axis direction). The second direction displacement spring portions 1a, 1b, 1c and 1d may be formed by, for example, patterning the silicon single crystal (and the multilayer structure including an interlayered insulating film or a metal film) forming the active layer of the SOI substrate. Since the silicon single crystal or the multilayer structure has some elasticity (and some stiffness), it may be used as an elastically modified member (elastic spring) through the patterned bar shape. A manufacturing method of the rocking body 300 may use the method shown in FIGS. 3A and 3B.

By this structure, the rocking body 300 functions as a third direction detection plate for detecting displacement in the third direction (Z axis direction) and also functions as a second direction detection plate for detecting displacement in the second direction (Y axis direction). Thereby, it is possible to detect variations in capacitances corresponding to the respective displacements in two different directions by the use of a single rocking body 300. Therefore, for example, it is possible to implement a small-sized and high-performance acceleration sensor which can detect accelerations in two different directions (third direction and second direction).

Next, the arrangement of pads and wires will be described. First pad PA1 to fifth pad PA5 are provided around the supporting body 100. The first pad PA1 is a pad used to supply the common potential VCOM (GND). The second pad PA2 is a pad used to transmit a first detection output VZ1 in the Z axis direction which is obtained from the first variable capacitor c1, to an external device. The detection circuit 13 (refer to FIG. 2A) may be provided instead of the second pad PA2, and the first detection output VZ1 in the Z axis direction which is obtained from the variable capacitor c1 may be input to the detection circuit 13. This is also the same for the other detection signals.

The third PA3 is a pad used to transmit a first detection output VY1 in the Y axis direction which is obtained from the third capacitor c3 for detecting acceleration in the second direction (Y axis direction), to the external device. The fourth pad PA4 is a pad used to transmit a second detection output VY2 in the Y axis direction which is obtained from the fourth capacitor c4 for detecting acceleration in the second direction (Y axis direction), to the external device. The fifth pad PA5 is a pad used to transmit a second detection output VZ2 in the Z axis direction which is obtained from the second variable capacitor c2, to the external device.

In addition, three wires L1 (marked with the thick chain line), L2 (marked with the thick rough dotted line) and L3 (marked with the thick fine dotted line) are provided on the frame 310 which is a part of the rocking body 300. The wire L1 is used to supply the common potential VCOM (GND) to the rocking body 300. The wire L2 is used to transmit the second detection output VY2 in the Y axis direction which is obtained from the fourth capacitor c4, to the external device. The wire L3 is used to transmit the first detection output VY1 in the Y axis direction which is obtained from the third capacitor c3, to the external device. In addition, other lines L4 to L10 necessary to form the electronic circuit are provided.

Figure 7A:
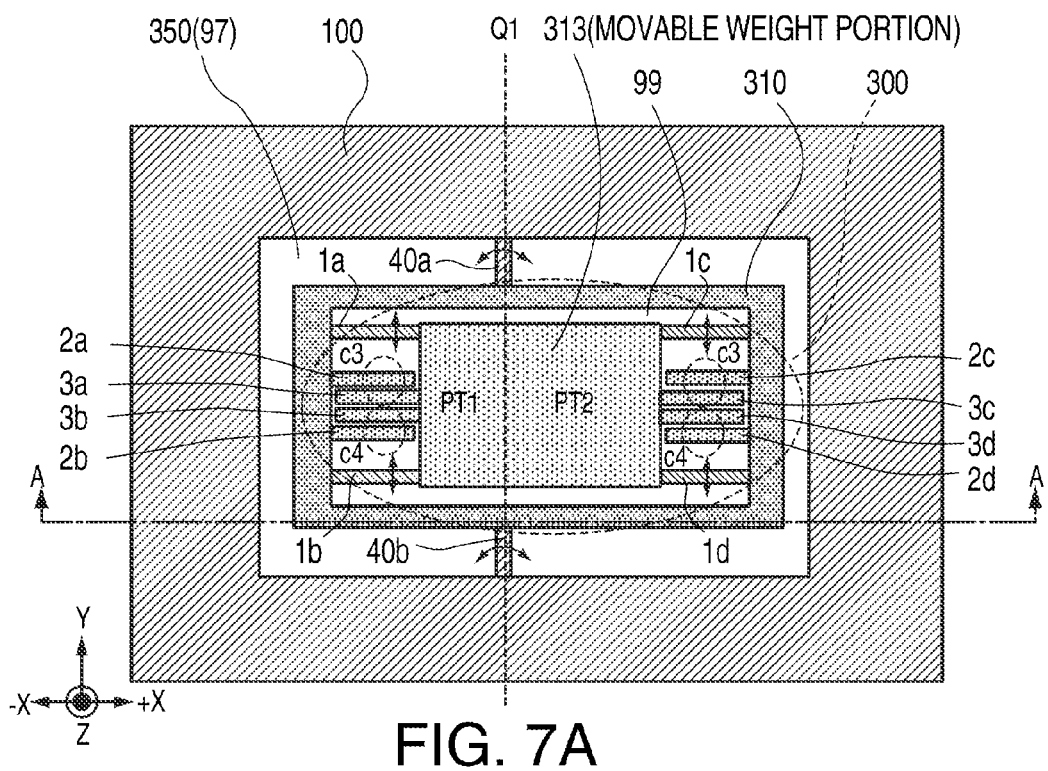
FIGS. 7A and 7B are diagrams illustrating the plan view and the cross-sectional view shown in FIG. 6 in the longitudinal direction (horizontal direction) through simplification.
Figure 7B:
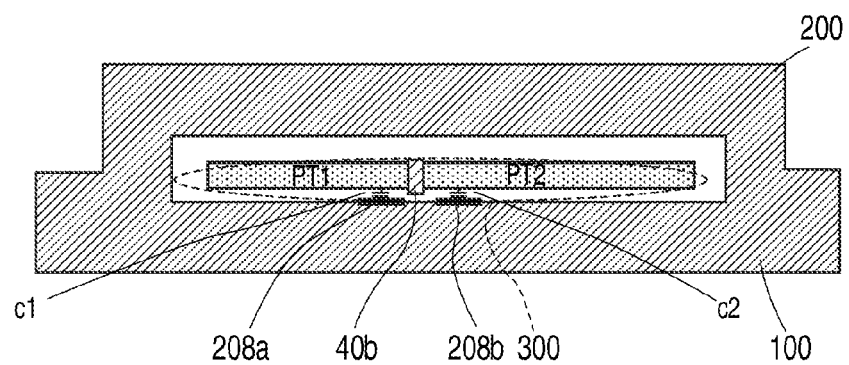

FIGS. 7A and 7B are diagrams illustrating the plan view and the cross-sectional view in the longitudinal direction (horizontal direction) shown in FIG. 6 through simplification. FIG. 7A is a plan view of the acceleration sensor (the covering body is not shown), and FIG. 7B is a cross-sectional view taken along the line A-A of FIG. 7A.

As described above, the rocking body 300 has the first seesaw piece PT1 and the second seesaw piece PT2. One end of the first supporting portion (first torsion spring) 40a and one end of the second supporting portion (second torsion spring) 40b are connected (fixed) to the frame 310 which is a part of the rocking body 300. In addition, the other end of the first supporting portion (first torsion spring) 40a and the other end of the second supporting portion (second torsion spring) 40b are connected to the supporting body 100.

The rocking body 300 includes the frame 310, the movable weight portion 313, the second direction displacement spring portions (elastic modification portions) 1a to 1d, the fixed electrode portions 2a to 2d and the movable electrode portions 3a to 3d.

The third capacitor c3 is formed by the fixed electrode portion 2a and the movable electrode portion 3a, and the fixed electrode 2c and the movable electrode 3c. In the same manner, the fourth capacitor c4 is formed by the fixed electrode portion 2b and the movable electrode portion 3b, and the fixed electrode portion 2d and the movable electrode portion 3d.

In this embodiment, the first torsion spring 40a and the second torsion spring 40b are connected to the frame 310 having stiffness. Therefore, the displacement in the third direction (Z axis direction) caused by the first torsion spring 40a and the second torsion spring 40b and the displacement in the second direction (Y axis direction) caused by the second direction displacement spring portions 1a to 1d are suppressed from interfering with each other (it can be considered that the displacements caused by the respective springs are independent from each other). Therefore, an adverse effect on the detection accuracy is sufficiently reduced. Thereby, for example, it is possible to implement a small-sized and high-performance acceleration sensor which can detect accelerations in two different directions (the Y axis direction and the Z axis direction).

Fourth Embodiment

Figure 8:
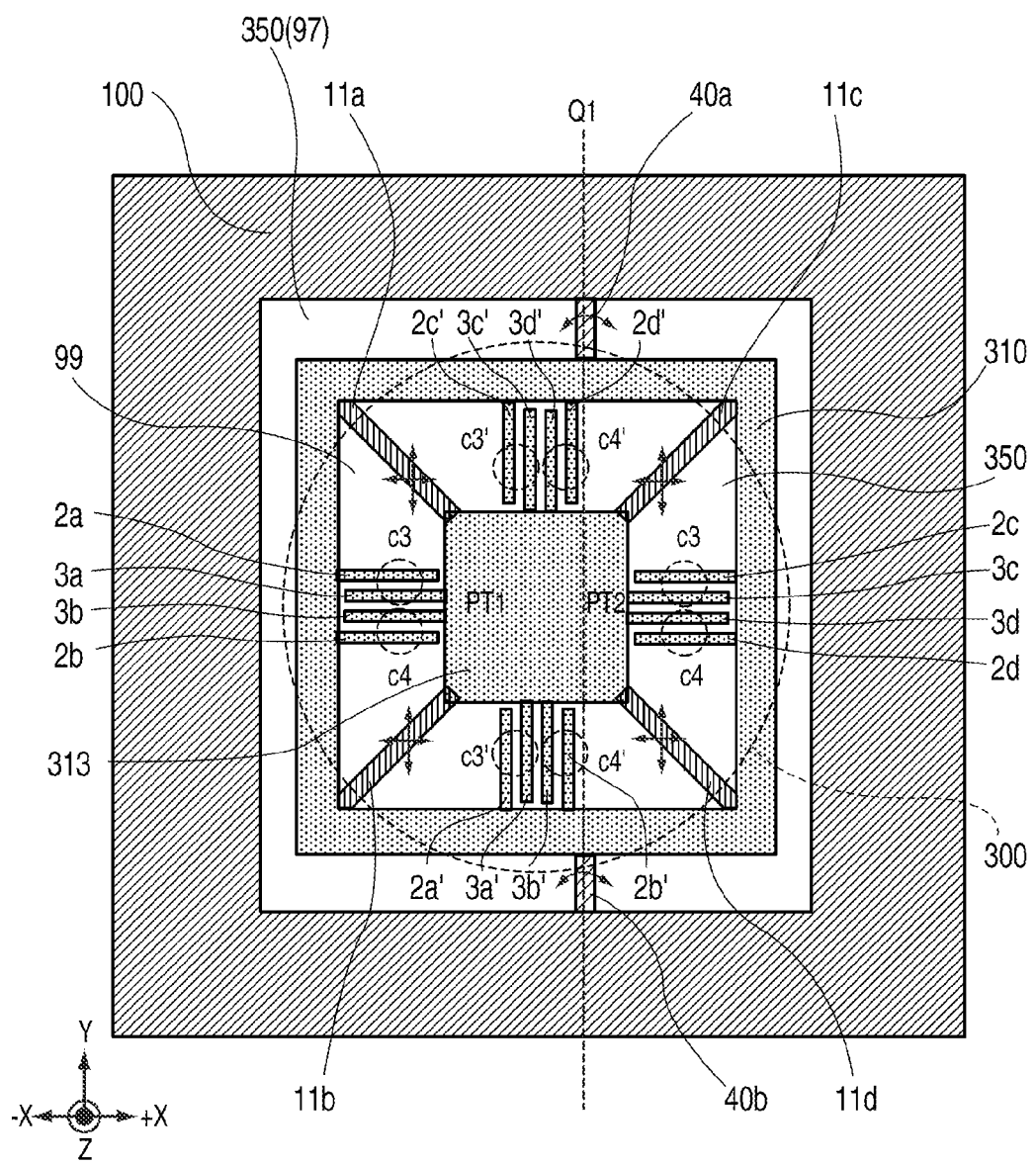
FIG. 8 is a plan view illustrating a configuration example of a physical quantity sensor having three-axis sensitivity, capable of respectively detecting variations in capacitance values in a first direction (X axis direction), in a second direction (Y axis direction), and in a third direction (Z axis direction).

In this embodiment, a three-axis sensitive physical quantity sensor which can detect variations in respective capacitances in the first direction (X axis direction), the second direction (Y axis direction), and the third direction (Z axis direction) will be described. FIG. 8 is a plan view illustrating a three-axis sensitive physical quantity sensor which can detect variations in respective capacitances in the first direction (X axis direction), the second direction (Y axis direction), and the third direction (Z axis direction). In FIG. 8, the elements common to those in the above-described embodiments are given the same reference numerals. In the following description, an acceleration sensor will be described as an example.

In the acceleration sensor shown in FIG. 8, the rocking body 300 includes a frame 310 which is connected to a first torsion spring 40a as a first supporting portion and a second torsion spring 40b as a second supporting portion; first direction and second direction displacement springs 11a to 11d which can be displaced in each direction of the first direction (X axis direction) and the second direction (Y axis direction); a movable weight portion 313 which is connected to the frame 310 via each of the first direction and second direction displacement springs 11a to 11d and around which a hollow portion 350 is formed; fixed electrode portions 2a, 2b, 2c, 2d, 2a', 2b', 2c' and 2d' which are formed to protrude from the frame 310 to the hollow portion 350; and movable electrode portions 3a, 3b, 3c, 3d, 3a', 3b', 3c' and 3d' which are integrally displaced with the movable weight portion 313 and face the fixed electrode portions 2a, 2b, 2c, 2d, 2a', 2b', 2c' and 2d'.

The main configuration is the same as the configuration of the physical quantity sensor shown in FIGS. 6 to 7B. However, the second direction displacement spring portions are used in the example shown in FIGS. 6 to 7B, whereas, in this embodiment, the first direction and second direction displacement springs 11a to 11d which can be displaced in each direction of the first direction (X axis direction) and the second direction (Y axis direction) are used. The first direction and second direction displacement springs 11a to 11d respectively extend from the four corners of the rectangular frame 310 in a direction forming substantially 45 degrees with the frame 310 when viewed in plan.

In this embodiment, the first variable capacitor c1 and the second variable capacitor c2 for detecting acceleration in the third direction (Z axis direction), the third capacitor c3 and the fourth capacitor c4 for detecting acceleration in the second direction (Y axis direction), and a fifth capacitor c3' and a sixth capacitor c4' for detecting acceleration in the first direction (X axis direction), are provided.

In this embodiment, the first torsion spring 40a and the second torsion spring 40b are connected to the frame 310 having stiffness. Therefore, the displacement in the third direction (Z axis direction) caused by the first torsion spring 40a and the second torsion spring 40b and the displacement in the first direction (X axis direction) or in the second direction (Y axis direction) caused by the first direction and the second direction displacement spring portions 11a to 11d are suppressed from interfering with each other (it can be considered that the displacements caused by the respective springs are independent from each other). Therefore, an adverse effect on the detection accuracy is sufficiently reduced. Thereby, for example, it is possible to implement a small-sized and high-performance acceleration sensor which can detect accelerations in three different directions (the first direction to the third direction).

Fifth Embodiment

In this embodiment, another example of a capacitance type acceleration sensor capable of detecting accelerations in two different directions will be described. In the following description, a capacitance type acceleration sensor will be described.

Figure 9:
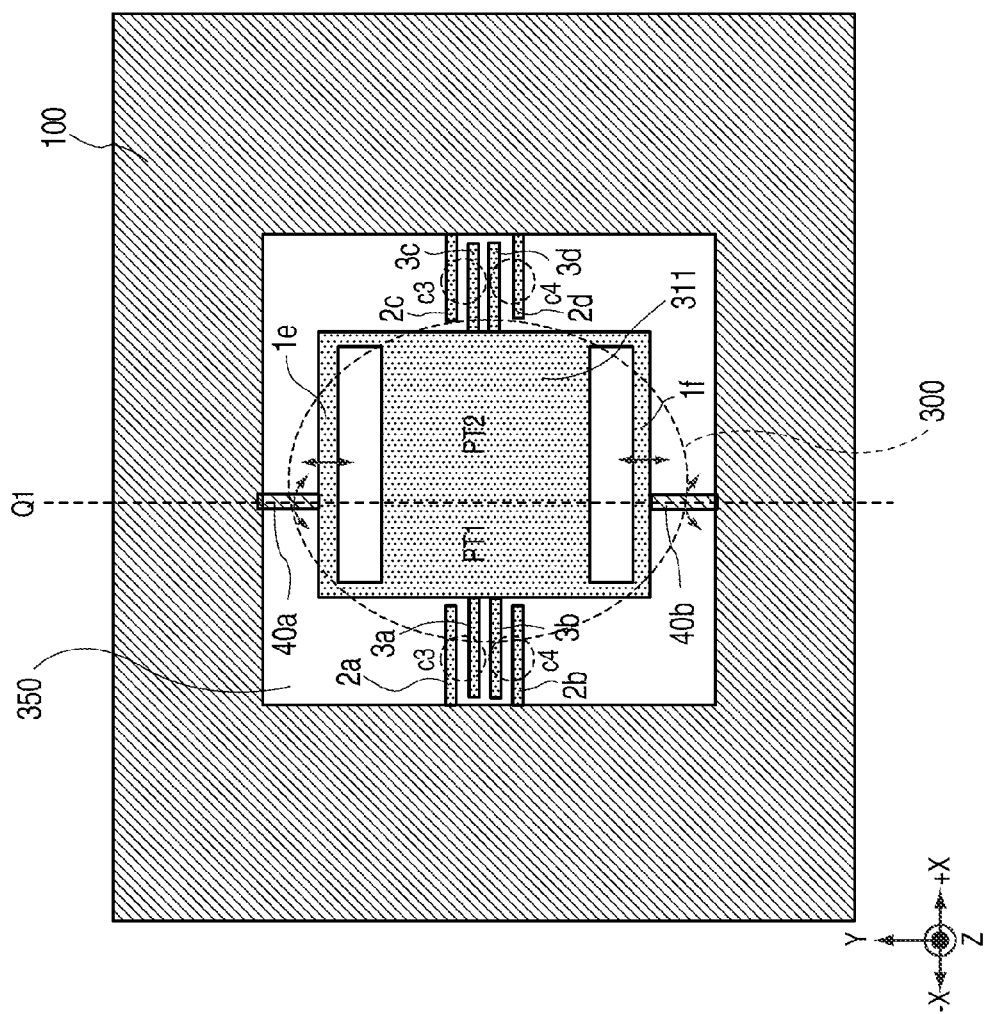
FIG. 9 is a diagram illustrating another example of a configuration of a physical quantity sensor (acceleration sensor) capable of detecting accelerations in two different directions.

FIG. 9 is a diagram illustrating another example of a configuration of the acceleration sensor which can detect accelerations in two different directions. In FIG. 9, the elements common to those in the above-described embodiments are given the same reference numerals.

As described above, in the example shown in FIGS. 6 to 7B, the first torsion spring 40a and the second torsion spring 40b are connected to the frame 310, but, in this embodiment, the first torsion spring 40a and the second torsion spring 40b are directly connected to second direction displacement springs 1e and 1f which can be displaced in the second direction (Y axis direction), respectively, without using the frame. The third capacitor c3 and the fourth capacitor c4 are provided, which is the same as the example shown in FIGS. 6 to 7B.

According to this embodiment, for example, it is possible to implement a high-performance acceleration sensor which can detect accelerations in two different directions (the third direction and the second direction). In addition, the frame can be omitted, and thus the size can be further reduced (the area taken-up is reduced).

Sixth Embodiment

Figure 10:
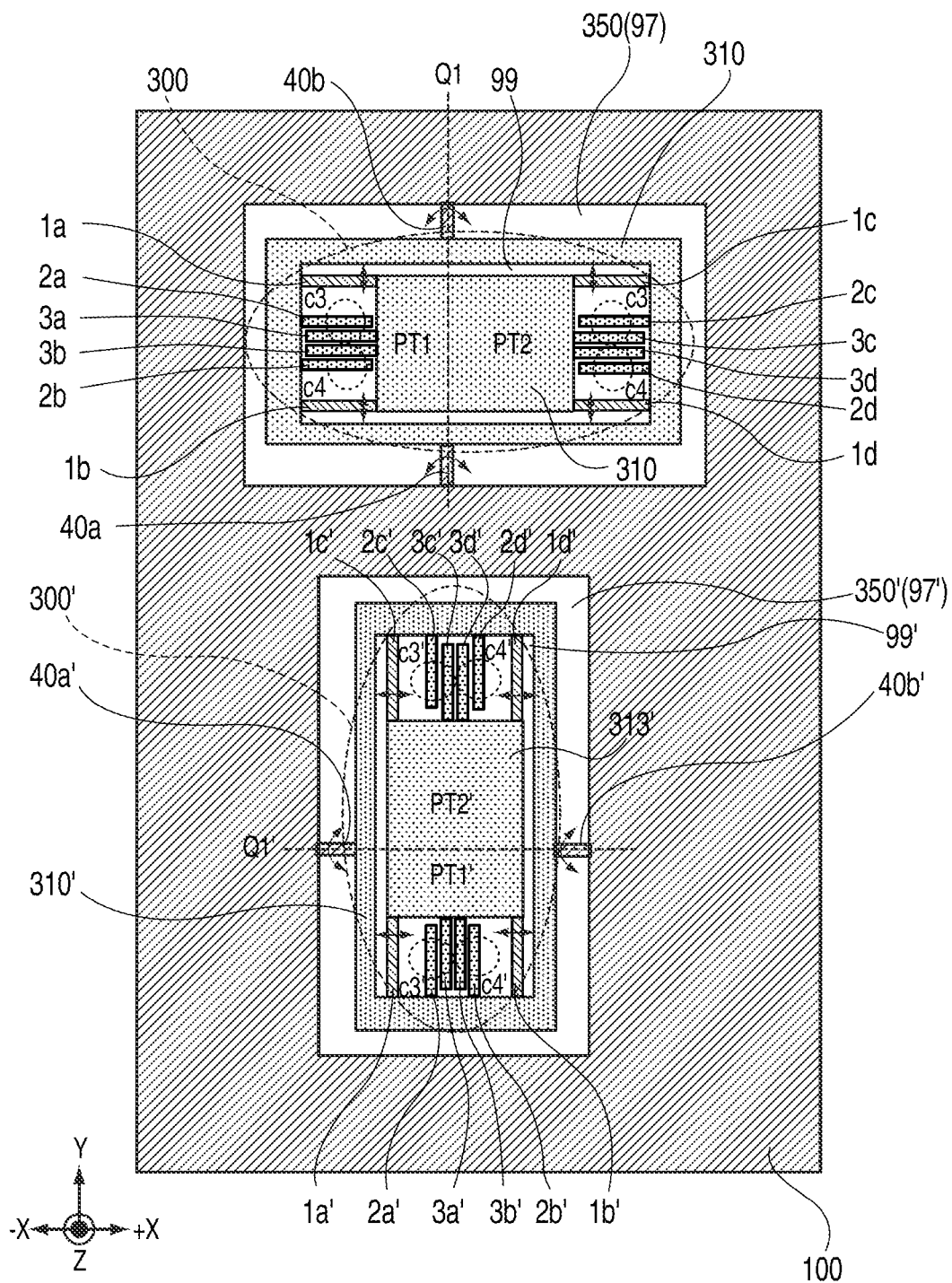
FIG. 10 is a plan view illustrating a configuration of an acceleration sensor capable of detecting accelerations in three different directions by using the two rocking bodies having the structures shown in FIGS. 6 to 7B.

FIG. 10 is a plan view illustrating a configuration of a physical quantity acceleration sensor which can detect accelerations in three different directions by using two rocking bodies having the structure shown in FIGS. 6 to 7B. In the example shown in FIG. 10, a rocking body 300 and a rocking body 300' are provided on a common supporting body 100. The rocking body 300 and the rocking body 300' have the same configuration as the rocking body 300 shown in FIGS. 6 to 7B. The reference numerals of the constituent elements of the rocking body 300' are given the prime symbol.

The supporting axis Q1 of the rocking body 300 extends in the second direction (Y axis direction). The supporting axis Q1' of the rocking body 300' extends in the first direction (X axis direction). The rocking body 300, as described above, functions as a detection plate for detecting acceleration in the third direction (Z axis direction) and also functions as a detection plate for detecting acceleration in the second direction (Y axis direction). On the other hand, the rocking body 300' functions as a detection plate for detecting acceleration in the third direction (Z axis direction) and also functions as a detection plate for detecting acceleration in the first direction (X axis direction).

According to this embodiment, it is possible to implement a high-performance physical quantity sensor (acceleration sensor) which can detect acceleration in the first direction (X axis direction), acceleration in the second direction (Y axis direction), and acceleration in the third direction (Z axis direction).

Seventh Embodiment

In this embodiment, a signal processing method for further improving the detection accuracy of the physical quantity sensor using the seesaw structure, and a configuration of the physical quantity sensor using the signal processing method, will be described.

FIGS. 11A to 11H are diagrams illustrating a signal processing method for further improving the detection accuracy of the physical quantity sensor using the seesaw structure. FIG. 11A shows a state where the rocking body 300 is maintained to be in a horizontal state (a state where acceleration in the Z axis direction is 0G). FIG. 11B shows a state of the rocking body 300 when acceleration in the Z axis direction is 1G. The rocking body 300 in FIG. 11B is tilted due to the unbalance between the torque of the first seesaw piece PT1 and the torque of the second seesaw piece PT2 (this is because gravitational acceleration cannot be detected in a state where the rocking body 300 is maintained to be in a horizontal state despite the gravitational acceleration being applied).

In this state, it is assumed that acceleration in the first direction (X axis direction) which is the extension direction of the rocking body 300 acts on the rocking body 300 (refer to FIG. 11C). As shown in FIG. 11C, when the acceleration G in the first direction (X axis direction: the extension direction of the horizontal rocking body) acts on the tilted rocking body 300, the inertial force F' works on the rocking body 300 in the direction opposite to the direction of the acceleration G in the first direction (X axis direction) (the magnitude of the inertial force is proportional to the acceleration G in the first direction). Since the inertial force F' has a component of a force rotating the tilted rocking body 300 (that is, a force vertically acting on the tilted rocking body 300), the tilt of the rocking body 300 varies (refer to FIG. 11D). In other words, although the acceleration in the third direction does not actually vary, the acceleration in the third direction seemingly is varied by the acceleration G in the first direction (the acceleration in the direction different from the detection direction (the third direction)). The detection sensitivity for the direction different from the detection direction causes the detection accuracy of the physical quantity sensor to be lowered.

This problem will be described in detail. As shown in FIG. 11D, the inertial force F' having the same magnitude acts on each of the first seesaw piece (first region) PT1 and the second seesaw piece (second region) PT2 of the rocking body 300. The inertial force F' applied to the first seesaw piece PT1 may be divided into a force component Fa1 in a direction of the extension line of the rocking body 300 and a force component Fb1 in a direction perpendicular to the rocking body 300. In the same manner, the inertial force F' applied to the second seesaw piece PT2 may be divided into a force component Fa2 in the direction of the extension line of the rocking body 300 and a force component Fb2 in the direction perpendicular to the rocking body 300. The force component Fb1, which acts on the first seesaw piece PT1, in the direction perpendicular to the rocking body 300 generates a counterclockwise torque in the first seesaw piece PT1 of the rocking body 300. On the other hand, the force component Fb2, which acts on the second seesaw piece PT2, in the direction perpendicular to the rocking body 300 generates a clockwise torque in the second seesaw piece PT2 of the rocking body 300. The force component Fb1 has the same magnitude as the force component Fb2.

However, in the example shown in FIG. 11D, the arm of the second seesaw piece PT2 is longer than the arm of the first seesaw piece PT1 (that is, the mass of the second seesaw piece PT2 is larger), and thus a difference between the torques occurs. In other words, the clockwise torque acting on the second seesaw piece PT2 having the longer arm is dominant, and thus the rocking body 300 itself rotates in the clockwise direction. The clockwise torque may be an apparent torque which is generated by the acceleration G in the first direction (X axis direction: the extension direction of the horizontal rocking body) acting on the tilted rocking body 300.

In addition, as shown in FIG. 11E, when the inertial force F' acts on the rocking body 300 (which has the tilt in the direction opposite to that in the example shown in FIG. 11D) as well, an apparent torque occurs for the same reason, and the tilt of the rocking body 300 varies. In FIG. 11E, the force component Fb1, which acts on the first seesaw piece PT1, in the direction perpendicular to the rocking body 300 generates a clockwise torque in the first seesaw piece PT1 of the rocking body 300. On the other hand, the force component Fb2, which acts on the second seesaw piece PT2, in the direction perpendicular to the rocking body 300 generates a counterclockwise torque in the second seesaw piece PT2 of the rocking body 300. The force component Fb1 has the same magnitude as the force component Fb2.

However, in the example shown in FIG. 11E, the arm of the first seesaw piece PT1 is longer than the arm of the second seesaw piece PT2 (that is, the mass of the first seesaw piece PT1 is larger), and thus a difference between the torques occurs. In other words, the clockwise torque acting on the first seesaw piece PT1 having the longer arm is dominant, and thus the rocking body 300 itself rotates in the clockwise direction. That is to say, in the same manner as the example shown in FIG. 11D, the tilt of the rocking body 300 is varied by the apparent clockwise torque.

Here, the example shown in FIG. 11D is compared with the example shown in FIG. 11E. In the example shown in FIG. 11D, the rocking body 300 rotates so as to increase the tilt due to the apparent torque. For example, if a tilt angle before the apparent torque occurs (an angle formed by the horizontal line and the rocking body) is θ, a tilt angle after the tilt is varied by the apparent torque is θ+δθ. On the other hand, in the example shown in FIG. 11E, the rocking body 300 rotates so as to decrease the tilt angle by the apparent torque, since the tilted rocking body returns to the horizontal state. For example, if a tilt angle before the apparent torque occurs (an angle formed by the horizontal line and the rocking body) is θ, a tilt angle after the tilt is varied by the apparent torque is θ−δθ.

In other words, when the tilted direction of the rocking body 300 is used as a reference, the direction of the apparent torque in the example shown in FIG. 11D and the direction of the apparent torque in the example shown in FIG. 11E are opposite to each other. For example, if the tilted direction of the rocking body 300 is a positive direction, the direction of the apparent torque in the example shown in FIG. 11D becomes a positive direction, and the direction of the apparent torque in the example shown in FIG. 11E becomes a negative direction. In other words, in FIGS. 11D and 11E, the rocking body 300 rotates by the same angle due to the apparent torque, but the directions are opposite to each other. This embodiment focuses on this point, a rocking body 300a having the structure in FIG. 11D and a rocking body 300b having the structure in FIG. 11E are used together, and a predetermined operation is performed based on a signal obtained from each rocking body, thereby suppressing errors generated by the apparent torque.

In other words, in this embodiment, as shown in FIG. 11F, two rocking bodies (that is, the first rocking body 300a and the second rocking body 300b) are provided. In addition, the above-described signal processing circuit (the reference numeral 10 in FIGS. 3A to 3D) performs a signal process for compensating for detection errors based on signals from the respective rocking bodies 300a and 300b and thereby suppresses the detection errors.

Here, the first rocking body 300a corresponds to the rocking body shown in FIG. 11D. The second rocking body 300b corresponds to the rocking body shown in FIG. 11E. The first rocking body 300a has a first seesaw piece (first region) PT1a and a second seesaw piece (second region) PT2a. The second rocking body 300b has a third seesaw piece (third region) PT1b and a fourth seesaw piece (fourth region) PT2b.

In other words, the first rocking body 300a is partitioned into the first region (first seesaw piece) PT1a and the second region (second seesaw piece) PT2a by the supporting axis Q1 (first axis) when viewed in plan. In addition, the second rocking body 300b is partitioned into the third region (the third seesaw piece) PT1b and the fourth region (the fourth seesaw piece) PT2b by the supporting axis Q2 (second axis) when viewed in plan.

Figure 12:
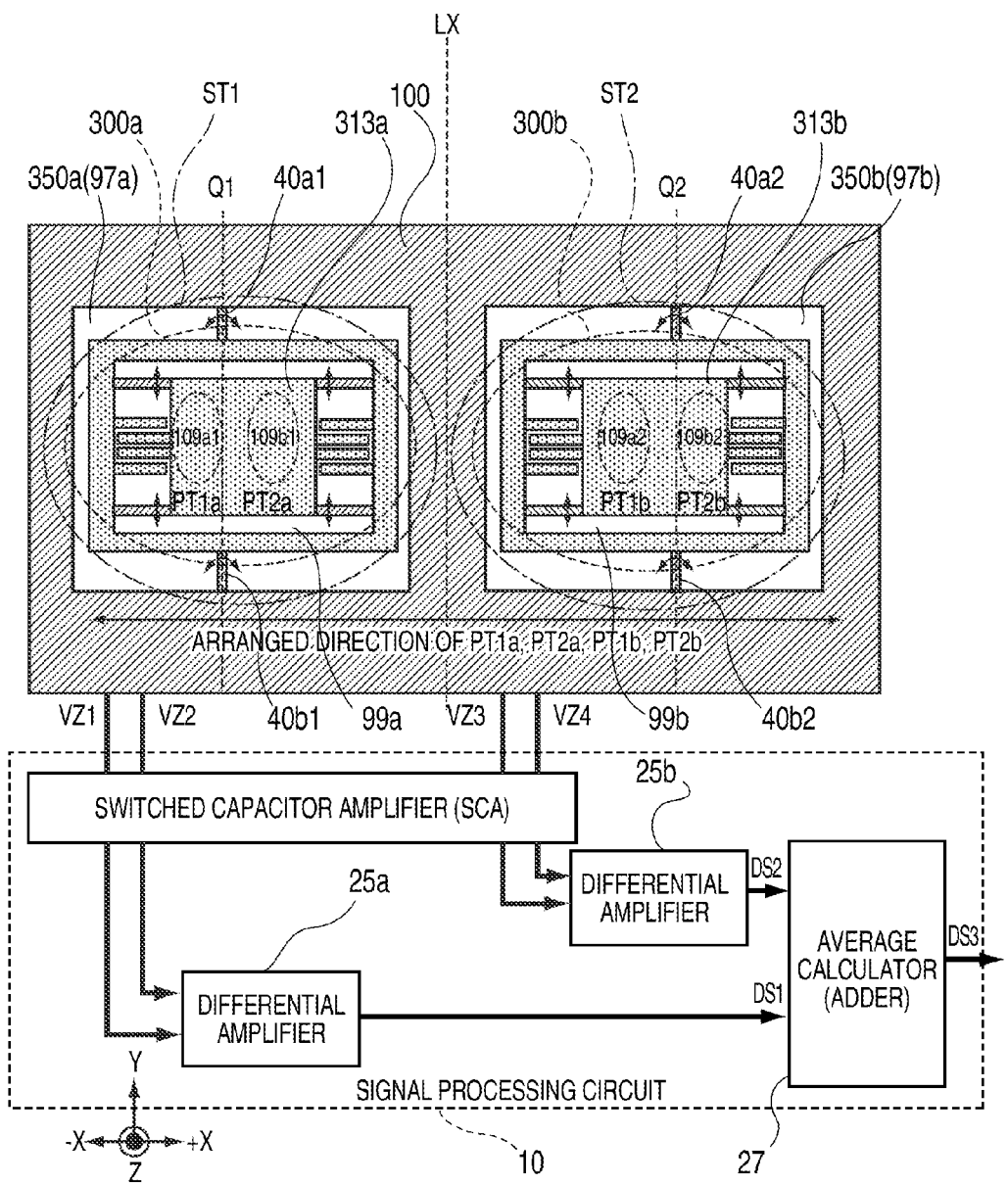
FIG. 12 is a diagram illustrating an example of a configuration of a physical quantity sensor using the signal processing method shown in FIGS. 11A to 11H.

In this embodiment, the first rocking body 300a and the second rocking body 300b are symmetrically arranged. The "symmetric arrangement" refers to, for example, an arrangement as shown in the plan view of FIG. 12. Here, this will be described with reference to FIG. 12. In FIG. 12, the second rocking body 300b has a shape in which the first rocking body 300a is reversed (turned back) to an axis LX perpendicular to the arranged direction of the first region (first seesaw piece) PT1a and the second region (second seesaw piece) PT2a when viewed in plan.

Returning to FIGS. 11F to 11H, the description will be continued. In FIGS. 11F and 11G, the mass of the second region (second seesaw piece) PT2a is larger than the mass of the first region (first seesaw piece) PT1a (this is because the former has the longer arm), and the mass of the third region (third seesaw piece) PT1b is larger than the mass of the fourth region (fourth seesaw piece) PT2b (this is because the former has the longer arm).

In addition, the arranged direction of the first region (first seesaw piece) PT1a and the second region (second seesaw piece) PT2a is the same as the arranged direction of the third region (third seesaw piece) PT1b and the fourth region (fourth seesaw piece) PT2b. In addition, in a state of being applied with gravity, as described in the examples shown in FIGS. 11D and 11E, the first rocking body 300a and the second rocking body 300b are tilted in the opposite directions to each other (refer to FIG. 11G).

Each of the first rocking body 300a and the second rocking body 300b includes two variable capacitors, and thus a total of four variable capacitors are provided. In the state shown in FIG. 11F, the first rocking body 300a and the second rocking body 300b are in the horizontal state, and each of the four variable capacitors has a capacitance value of C0.

Here, as detection signals, a first detection signal which is varied based on the displacement of the first seesaw piece (first region) PT1a of the first rocking body 300a, a second detection signal which is varied based on the displacement of the second seesaw piece (second region) PT2a of the first rocking body 300a, a third detection signal which is varied based on the displacement of the third seesaw piece (third region) PT1b of the second rocking body 300b, and a fourth detection signal which is varied based on the displacement of the fourth seesaw piece (the fourth region) PT2b of the second rocking body 300b, are output.

In the following description, the first detection signal and the second detection signal are referred to as differential outputs 1, and the third detection signal and the fourth detection signal are referred to as differential outputs 2. In the state shown in FIG. 11F, the differential outputs 1 become (C0, C0), and the differential outputs 2 also become (C0, C0).

In the state where the gravitational acceleration 1G exists, as shown in FIG. 11G, each of the first rocking body 300a and the second rocking body 300b is tilted by being applied with the torque.

Here, although the first rocking body 300a and the second rocking body 300b both extend in the first direction (X axis direction), the tilted direction of the first rocking body 300a is opposite to the titled direction of the second rocking body 300b, and the absolute values of the rotation angles are the same as each other when the horizontal plane is used as a reference. For example, the first rocking body 300a is tilted in the clockwise direction by $+\theta$ with respect to the horizontal plane, and, in contrast, the second rocking body 300b is tilted in the counterclockwise direction by $-\theta$ with respect to the horizontal plane.

In the state shown in FIG. 11G, the differential outputs 1 become (C0+ΔC, C0−ΔC). The differential outputs 2 become (C0−ΔC, C0+ΔC). Here, ΔC indicates an amount to be varied in a capacitance value of each capacitor due to the tilt of the rocking bodies 300a and 300b.

In this state, in the same manner as the example shown in FIG. 11C, it is assumed that the acceleration G in the first direction (X axis direction) is applied, and the inertial force F' works in the opposite direction thereto. In this case, each of the first rocking body 300a and the second rocking body 300b is tilted as shown in FIG. 11H. In other words, as shown in FIG. 11D, the clockwise apparent torque occurs in the first rocking body 300a. On the other hand, as shown in FIG. 11E, the clockwise apparent torque also occurs in the second rocking body 300b. However, when each of the tilted directions of the rocking bodies 300a and 300b is used as a reference, the direction of the apparent torque occurring in the first rocking body 300a is opposite to the direction of the apparent torque occurring in the second rocking body 300b (the former has the direction increasing the tilt of the first rocking body 300a, and the latter has the direction decreasing the tilt of the second rocking body 300b). The apparent torque occurring in the first rocking body 300a and the apparent torque occurring in the second rocking body 300b have the same magnitude and the opposite direction.

Therefore, each of the first rocking body 300a and the second rocking body 300b is tilted as shown in FIG. 11H. Here, if a variation amount in the capacitance value of the variable capacitor (capacitor) caused by a displacement error, which is superposed on the first detection signal, resulting from the apparent torque is, for example, "+δC", a variation amount in the capacitance value regarding the second detection signal is "−δ", and, in the same manner, a variation amount, in the capacitance value of the variable capacitor (capacitor) caused by a displacement error, which is superposed on the third detection signal, resulting from the apparent torque is "+δC", and a variation amount in the capacitance value regarding the fourth detection signal is "−δC".

In other words, in the state shown in FIG. 11G, the differential outputs 1 become (C0+ΔC+δC, C0−ΔC−δC). In addition, the differential outputs 2 become (C0−ΔC+δC, C0+ΔC−δC).

In the signal processing circuit, when a first differential signal indicating a difference between the first detection signal and the second detection signal is generated based on the differential outputs 1, the first differential signal has a value of 2(ΔC+δC). In other words, the variation amount in the capacitance value of the variable capacitor (capacitor) caused by a displacement error, which is superposed on the first differential signal, resulting from the apparent torque becomes "2δC (=+δC−(−δC))".

In addition, when a second differential signal indicating a difference between the fourth detection signal and the third detection signal occurs, the second differential signal has a value of 2(ΔC−δC). In other words, the variation amount in the capacitance value of the variable capacitor (capacitor) caused by a displacement error, which is superposed on the second differential signal, resulting from the apparent torque becomes "−2δC (=−δC−(+δC))".

When the signal processing circuit adds the first differential signal to the second differential signal, the error component "+2δC" superposed on the first differential signal and the error component "−2δC" superposed on the second differential signal cancel each other out, and thus the error is removed.

In addition, when the first differential signal is added to the second differential signal, there is a case where the signal amplitude is larger than necessary. If this causes a problem, a signal process for decreasing an amplitude of a signal obtained by adding the first differential signal to the second differential signal, for example, by half (that is, (the first differential signal+the second differential signal)/2) may be appropriately performed.

In other words, the signal processing circuit can generate the first differential signal indicating the difference between the first detection signal and the second detection signal, generate the second differential signal indicating the difference between the third detection signal and the fourth detection signal, and generate the acceleration detection signal in the third direction, in which the error based on the acceleration in the first direction is suppressed, using the signal obtained by adding the first differential signal to the second differential signal.

In this way, according to the signal processing method in this embodiment, it is possible to remove the error caused by the detection sensitivity for directions other than the detection direction through the signal process. Therefore, it is possible to further improve the detection accuracy of the physical quantity sensor using the seesaw structure for acceleration in the third direction or the like.

FIG. 12 is a diagram illustrating an example of a configuration of the physical quantity sensor employing the signal processing method shown in FIGS. 11A to 11H. The physical quantity sensor in FIG. 12 includes a first seesaw structure ST1, a second seesaw structure ST2, and the signal processing circuit which performs a predetermined signal process based on detection signals output from the respective first seesaw structure ST1 and the second seesaw structure ST2.

The signal processing circuit 10 includes the switched capacitor amplifier SCA (refer to FIGS. 5A to 5C), differential amplifiers 25a and 25b, and an average calculator (or an adder) 27. The switched capacitor amplifier SCA and the differential amplifiers 25a and 25b correspond to the C/V conversion circuit 24 shown in FIG. 4. In addition, the average calculator (or the adder) 27 is included in, for example, the analog correction and A/D conversion circuit 26 shown in FIGS. 4A to 4C.

The first seesaw structure ST1 includes a first rocking body 300a, a first supporting portion 40a1 for the first rocking body and a second supporting portion 40b1 for the first rocking body which support the first rocking body 300a at both sides so as to seesaw-rock with respect to a first supporting axis Q1 (first axis), and a first variable capacitor portion (not shown) having first movable electrodes 109a1 and 109b1 for the first rocking body which change their positions according to the seesaw rocking of the first rocking body 300a and fixed electrodes (not shown) for the first rocking body which are provided at positions facing the first movable electrodes 109a1 and 109b1 for the first rocking body.

The first rocking body 300a includes a first seesaw piece (first region) PT1a of the first rocking body 300a, corresponding to one of two parts which are partitioned by the first supporting axis Q1, and a second seesaw piece (second region) PT2a of the first rocking body 300a, corresponding to the other of two parts, when viewed in plan.

The second seesaw structure ST2 includes a second rocking body 300b, a first supporting portion 40a2 for the second rocking body and a second supporting portion 40b2 for the second rocking body which support the second rocking body 300b at both sides so as to seesaw-rock with respect to a second supporting axis Q2 (second axis), and a second variable capacitor portion (not shown) having movable electrodes (not shown) for the second rocking body which change their positions according to the seesaw rocking of the second rocking body 300b and fixed electrodes (not shown) for the second rocking body which are provided at positions facing the movable electrodes for the second rocking body.

The second rocking body 300b includes a third seesaw piece (third region) PT1b, corresponding to one of two parts which are partitioned by the second supporting axis Q2 (second axis), and a fourth seesaw piece (fourth region) PT2b, corresponding to the other of two parts, when viewed in plan. The longitudinal direction of the first rocking body 300a and the longitudinal direction of the second rocking body 300b in the plan view are referred to as a first direction (for example, the X axis direction), the direction perpendicular to the first direction in the plan view is referred to as a second direction (for example, the Y axis direction), and the direction perpendicular to each of the first and second directions is referred to as a third direction (for example, the Z axis direction). At this time, in a state where acceleration having the same magnitude in the third direction acts on each of the first rocking body 300a and the second rocking body 300b, the tilted direction of the first rocking body 300a and the tilted direction of the second rocking body 300b are opposite to each other, and the absolute values of the rotation angles of the first rocking body 300a and the second rocking body 300b are the same as each other when the horizontal plane is used as a reference.

As detection signals, a first detection signal VZ1 which is varied based on the displacement of the first seesaw piece PT1a of the first rocking body 300a, and a second detection signal VZ2 which is varied based on the displacement of the second seesaw piece PT2a of the first rocking body 300a, are output from the first seesaw structure ST1. In addition, as detection signals, a third detection signal VZ3 which is varied based on the displacement of the third seesaw piece (third region) PT1b of the second rocking body 300b, and a fourth detection signal VZ4 which is varied based on the displacement of the fourth seesaw piece (the fourth region) PT2b of the second rocking body 300b, are output from the second seesaw structure ST2.

The differential amplifier 25a included in the signal processing circuit 10 generates a first differential signal DS1 indicating a difference between the first detection signal VZ1 and the second detection signal VZ2. The differential amplifier 25b generates a second differential signal DS2 indicating a difference between the fourth detection signal VZ4 and the third detection signal VZ3. The first differential signal DS1 and the second differential signal DS2 are input to the average calculator (or the adder) 27. The average calculator (or the adder) 27 performs an adding process for the first differential signal DS1 and the second differential signal DS2. For example, a signal process such as (DS1+DS2) or ((DS1+DS2)/2) is performed, and a detection signal DS3 of acceleration in the third direction (Z axis direction) or the like, in which errors caused by acceleration in the first direction (X axis direction) are suppressed, is generated based on a signal obtained as a result thereof. The detection signal DS3 may be a signal itself indicating a result of the signal process such as (DS1+DS2) or ((DS1+DS2)/2) or may be a signal having undergone an analog correction process.

Eighth Embodiment

Figure 13:
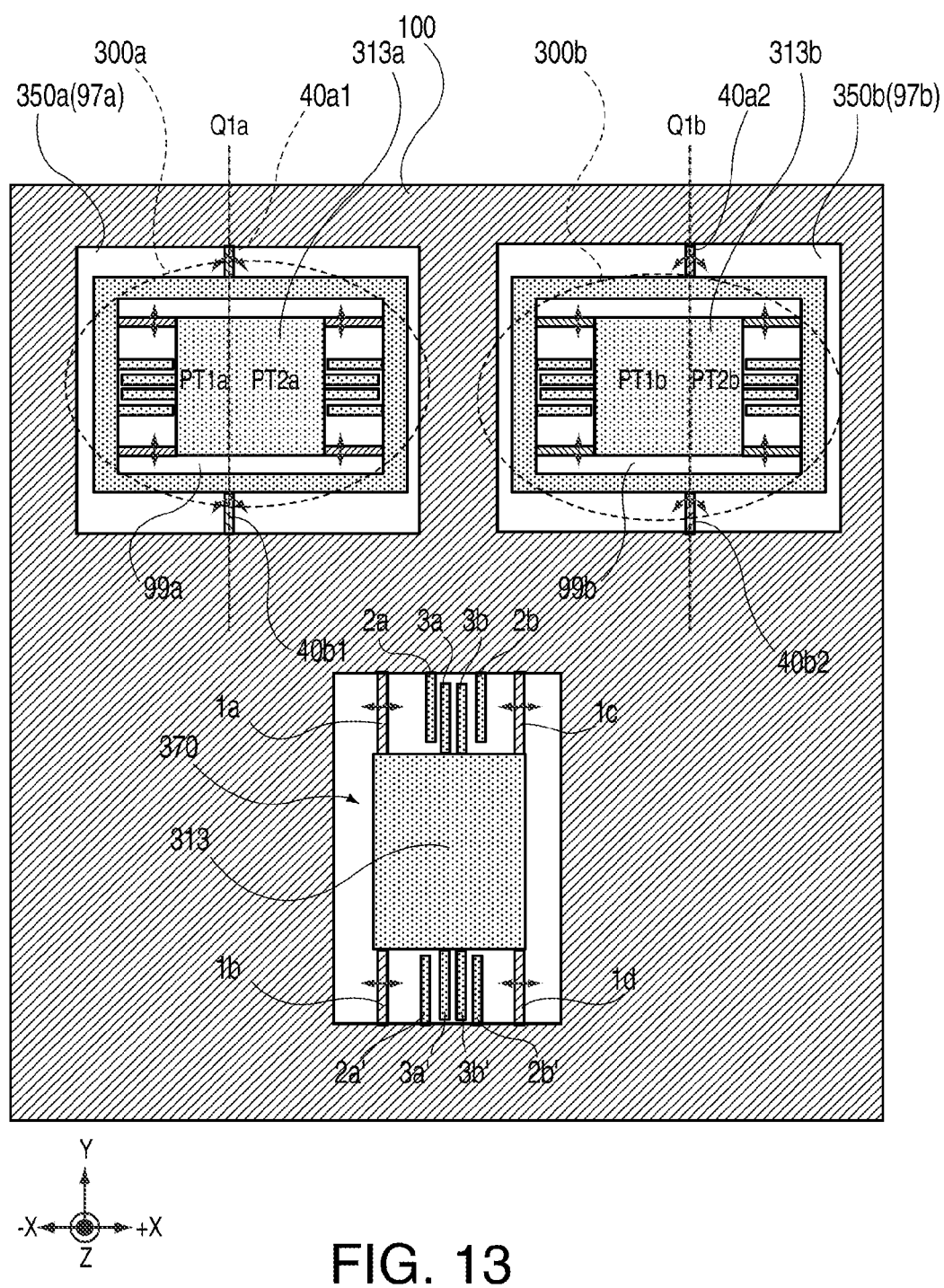
FIG. 13 is a plan view illustrating another example of the physical quantity sensor (acceleration sensor) (an example where a configuration for detecting acceleration in the first direction (X axis direction) is added to the configuration shown in FIG. 12).

FIG. 13 is a plan view illustrating another example of the physical quantity acceleration sensor (an example where a configuration for detecting acceleration in the first direction (X axis direction) is added to the configuration shown in FIG. 12). In the example shown in FIG. 13, a capacitance type physical quantity sensor 370 for detecting acceleration in the first direction (X axis direction) is added to the configuration in FIG. 12. The physical quantity acceleration sensor 370 has only a function for detecting acceleration in the first direction (X axis direction) and does not have a function for detecting acceleration in the third direction (Z axis direction) caused by the seesaw rocking (the reason is that since acceleration in the third direction can be detected with high accuracy using the pair of rocking bodies 300a and 300b, a rocking body is not necessary any more).

The acceleration sensor 370 for detecting acceleration in the first direction (X axis direction) includes a movable weight portion 313, springs 1a, 1b, 1c and 1d which can be deformed in the first direction, fixed electrodes 2a, 2b, 2a' and 2b', and movable electrodes 3a, 3b, 3a' and 3b'. When the movable weight portion 313 is displaced in the X axis direction, the movable electrodes 3a, 3b, 3a' and 3b' are also displaced, capacitance values of variable capacitors formed by the respective fixed electrodes 2a, 2b, 2a' and 2b' and the movable electrodes 3a, 3b, 3a' and 3b' are varied, and charges are moved in response thereto, thereby generating micro electrical signals (current signals). Therefore, it is possible to detect acceleration in the first direction (X axis direction) based on the electrical signals.

The physical quantity sensor in FIG. 13 can detect acceleration in the first direction (X axis direction) and acceleration in the third direction (Z axis direction), and detect acceleration in the third direction (Z axis direction) with higher accuracy since errors in the acceleration in the third direction (Z axis direction) accompanied by sensitivity for other axes can be suppressed by an error compensation process.

Ninth Embodiment

Although the rocking body can seesaw-rock by shifting the supporting portions of the rocking body to a position parallel to the line passing through the center of the rocking body in the above-described embodiments, the invention is not limited thereto, but various modifications or applications are possible.

Figure 15A:
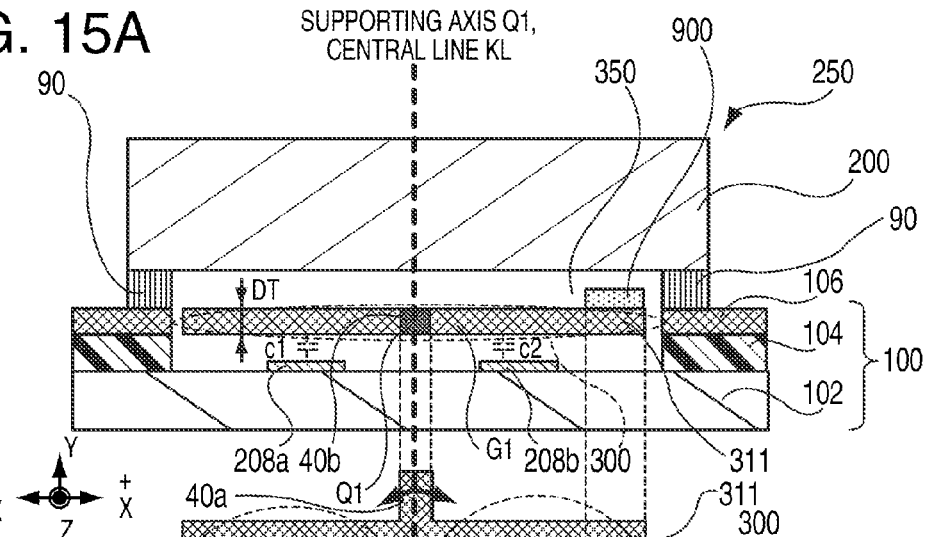
FIGS. 15A to 15D are diagrams illustrating another example of a structure of the physical quantity sensor.
Figure 15B:
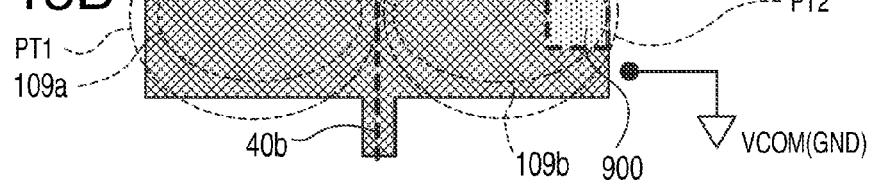

FIGS. 15A to 15D are diagrams illustrating another example of a structure of the physical quantity sensor. In FIGS. 15A to 15D, the parts common to those in the above-described figures are given the same reference numerals. In the example shown in FIGS. 15A and 15B, a mass portion 900 is provided at one end of the rocking body 300. FIG. 15A is a cross-sectional view of the physical quantity sensor (sensor element structure), and FIG. 15B is a plan view illustrating the structure of the rocking body 300 corresponding to FIG.

15A. Due to the provision of the mass portion 900, the rocking body 300 can seesaw-rock, for example, even in a case where the first seesaw piece PT1 and the second seesaw piece PT2 have the same length in the longitudinal direction.

In other words, in the example shown in FIGS. 15A and 15B, the supporting axis Q1 corresponds with the line (central line) KL passing through the center of the rocking body 300. In other words, the first supporting portion 40a and the second supporting portion 40b are provided on the line (central line) KL passing through the center of the rocking body 300. Even in this kind of configuration, the mass portion 900 can generate a torque, and thus the rocking body 300 can seesaw-rock.

The mass portion 900 may be formed using a film such as, for example, a metal film or an insulating film, or may be formed by thickening or the like through etching of the rocking body 300. The mass portion 900 is trimmed by laser, or removed by etching, or a film is formed by sputtering, deposition, or the like, thereby increasing or decreasing the mass in a simple manner. Therefore, a minute adjustment of the seesaw rocking can be simply performed.

Figure 15C:
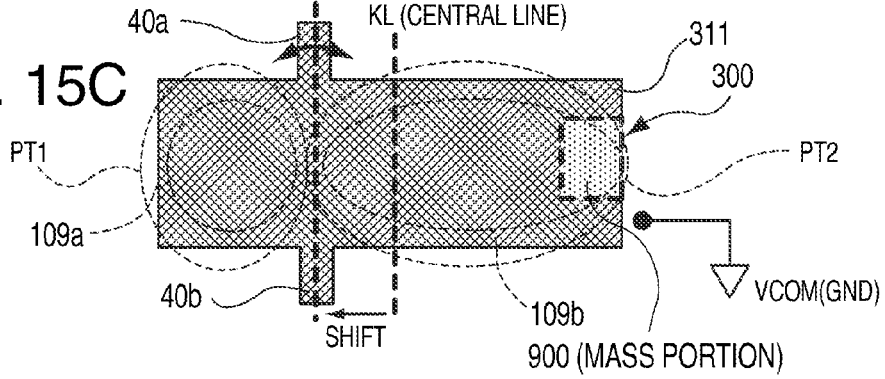
Figure 15D:
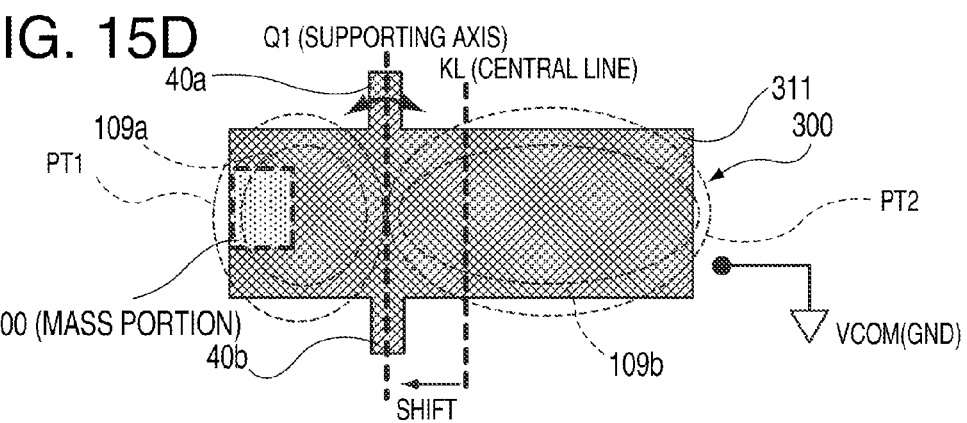

In the examples shown in FIGS. 15C and 15D, the supporting axis Q1 does not correspond with the central line KL. In other words, each of the first supporting portion 40a and the second supporting portion 40b is shifted in parallel to the line (central line) KL passing through the center of the rocking body 300. In addition, the mass portion 900 is provided at one end of the rocking body 300.

For example, in a case where the area of the first seesaw piece (first region) PT1 of the rocking body 300 in the plan view becomes smaller than the area of the second seesaw piece (second region) PT2 in the plan view since the supporting axis Q1 of the rocking body 300 is shifted, if the mass portion 900 is formed on the second seesaw piece (second region) PT2 as shown in FIG. 15C, the seesaw rocking of the rocking body 300 becomes more notable, thereby improving the detection sensitivity of a capacitor.

In addition, as shown in FIG. 15D, if the mass portion 900 is formed on the second seesaw piece (second region) PT2, it is possible to suppress the seesaw rocking of the rocking body 300. Thereby, it is possible to suppress the supporting portions (the first supporting portion 40a and the second supporting portion 40b) supporting the rocking body 300 from being twisted too greatly. Therefore, the supporting portions (the first supporting portion 40a and the second supporting portion 40b) can be prevented from being damaged.

In addition thereto, a mass portion may be formed on the entire surface of the rocking body, and the mass of the mass portion may be increased or decreased so as to vary the mass balances between the first region and the second region of the rocking body, thereby performing the seesaw rocking.

Tenth Embodiment

FIG. 16 is a diagram illustrating an example of a configuration of an electronic apparatus. The electronic apparatus in FIG. 16 includes the physical quantity sensor (for example, the capacitance type physical quantity acceleration sensor) related to one of the above-described embodiments. The electronic apparatus is, for example, a game controller, a motion sensor, or the like.

As shown in FIG. 16, the electronic apparatus includes a sensor device (a capacitance type acceleration sensor or the like) 410, an image processing portion 420, a processing portion 430, a storage portion 440, an operation portion 450, and a display portion 460. The configuration of the electronic apparatus is not limited to the configuration shown in FIG. 16, but various modifications are possible, for example, a part of the constituent elements (for example, the operation portion, the display portion, and the like) may be omitted, or other constituent elements may be added.

Figure 17:
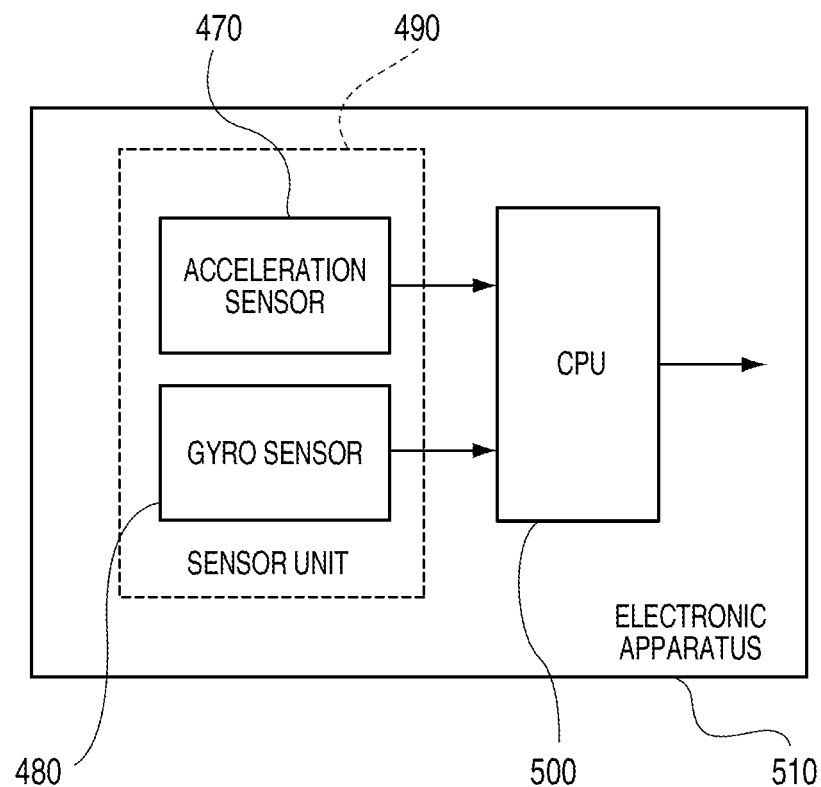
FIG. 17 is a diagram illustrating another configuration example of an electronic apparatus.

FIG. 17 is a diagram illustrating another example of a configuration of the electronic apparatus. An electronic apparatus 510 shown in FIG. 17 has a sensor unit 490 including a physical quantity sensor 470 which is the acceleration sensor related to one of the above-described embodiments and a detection element 480 for detecting a physical quantity other than acceleration (here, a gyro sensor for detecting angular velocity), and a CPU 500 which performs a predetermined signal process for detection signals output from the sensor unit 490. The sensor unit 490 itself may be considered as a single electronic apparatus.

In other words, the capacitance type physical quantity acceleration sensor 470 which has a good assembly property, a small size, and high performance, and another sensor (for example, a vibrating gyro sensor using a physical quantity structure) 480 which detects a different kind of physical quantity, are used together, and thereby it is possible to implement the small-sized and high-performance electronic apparatus. In other words, it is possible to implement the sensor unit 490 including a plurality of sensors as an electronic apparatus, or the higher order electronic apparatus (for example, an FA apparatus) 510 mounting the sensor unit 490 thereon.

In this way, according to at least one embodiment of the invention, for example, even if acceleration in directions other than a detection axis direction occurs, it is possible to improve the detection accuracy of the physical quantity sensor having good detection sensitivity. In addition, for example, it is possible to improve the assembly property of the physical quantity sensor including the sealing body (package). Further, it is possible to implement the small-sized and high-performance electronic apparatus.

Although some embodiments have been described above, it can be easily understood by those skilled in the art that various modifications are possible without substantially departing from the new matters and the effects of the invention. Therefore, the invention is intended to cover the various modifications. For example, in the specification or the drawings, a term disclosed along with another term which is broader than or equivalent to the term can be changed to another term in any part of the specification or the drawings. The invention is applicable to an inertial sensor. For example, the sensor related to the embodiments of the invention may be used as a capacitance type acceleration sensor or a capacitance type gyro sensor.

What is claimed is:

1. A physical quantity sensor comprising:
   a rocking body supported by a first supporting portion and a second supporting portion which are disposed on a first axis, and partitioned into a first region and a second region by the first axis when viewed in plan, where each of the first and second regions is provided with a movable electrode; and
   fixed electrodes facing the movable electrode,
   wherein the mass of the second region is larger than the mass of the first region, and
     wherein the rocking body includes:
   an opening portion;
   a moveable weight portion disposed at the opening portion;
   a connection portion connecting the movable weight portion to the rocking body;
   a first arm shaped electrode portion provided toward the movable weight portion from the rocking body; and a second arm shaped electrode portion provided toward the rocking body from the movable weight portion and facing the first arm shaped electrode portion.

2. The physical quantity sensor according to claim 1, wherein the first arm shaped electrode portion and the second arm shaped electrode portion are respectively provided in the first region and the second region.

3. The physical quantity sensor according to claim 1, wherein the first arm shaped electrode portion and the second arm shaped electrode portion are provided in a direction at least one of parallel to the first axis and the intersect to the first axis.

4. The physical quantity sensor according to claim 1, wherein the first axis is parallel to a line passing through a center of the rocking body.

5. The physical quantity sensor according to claim 1, wherein the fixed electrodes include a first fixed electrode facing the first region, and a second fixed electrode facing the second region.

6. The physical quantity sensor according to claim 1, wherein the movable electrode is commonly provided to extend over the first region and the second region.

7. The physical quantity sensor according to claim 1, wherein the first and the second supporting portions are formed using a torsion spring.

8. A motion sensor comprising the physical quantity sensor according to claim 1.

* * * * *